US007981517B2

(12) United States Patent
Walther et al.

(10) Patent No.: US 7,981,517 B2
(45) Date of Patent: Jul. 19, 2011

(54) BITUMINOUS COMPOSITIONS AND METHODS OF MAKING AND USING SAME

(75) Inventors: Brian W. Walther, Clute, TX (US); Arnis U. Paeglis, Friendswood, TX (US); Morgan M. Hughes, Angleton, TX (US); Carl F. Baker, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 247 days.

(21) Appl. No.: 12/195,133

(22) Filed: Aug. 20, 2008

(65) Prior Publication Data

US 2009/0061236 A1  Mar. 5, 2009

Related U.S. Application Data

(60) Provisional application No. 60/968,389, filed on Aug. 28, 2007.

(51) Int. Cl.
*B32B 11/06* (2006.01)
*C08L 95/00* (2006.01)
(52) U.S. Cl. .............. 428/440; 524/62; 524/68; 524/71; 428/489; 428/491; 427/138
(58) Field of Classification Search ............. 428/440, 428/489, 491; 427/138; 524/62, 68, 71
See application file for complete search history.

(56) References Cited

U.S. PATENT DOCUMENTS

| | | | |
|---|---|---|---|
| 2,972,600 A | 2/1961 | Braidwood |
| 3,093,613 A | 6/1963 | Fusco et al. |
| 3,287,440 A | 11/1966 | Giller |
| 3,709,840 A | 1/1973 | Dehoff |
| 3,873,483 A | 3/1975 | Oelsner et al. |
| 4,069,181 A | 1/1978 | Healy et al. |
| 4,129,542 A | 12/1978 | Matheson et al. |
| 4,442,276 A | 4/1984 | Kashiwa et al. |
| 4,460,701 A | 7/1984 | Terano et al. |
| 4,530,914 A | 7/1985 | Ewen et al. |
| 4,540,679 A | 9/1985 | Arzoumanidis et al. |
| 4,544,762 A | 10/1985 | Kaminsky et al. |
| 4,547,476 A | 10/1985 | Terano et al. |
| 4,617,227 A | 10/1986 | Weaver |
| 4,738,997 A | 4/1988 | Lundberg et al. |
| 4,816,433 A | 3/1989 | Terano et al. |
| 4,829,037 A | 5/1989 | Terano et al. |
| 4,871,705 A | 10/1989 | Hoel |
| 4,927,797 A | 5/1990 | Ewen |
| 4,937,299 A | 6/1990 | Ewen et al. |
| 4,990,479 A | 2/1991 | Ishimaru et al. |
| 5,015,749 A | 5/1991 | Schmidt et al. |
| 5,017,714 A | 5/1991 | Welborn, Jr. |
| 5,026,798 A | 6/1991 | Canich |
| 5,028,671 A | 7/1991 | Kioka et al. |
| 5,034,361 A | 7/1991 | Job et al. |
| 5,041,584 A | 8/1991 | Crapo et al. |
| 5,041,585 A | 8/1991 | Deavenport et al. |
| 5,055,438 A | 10/1991 | Canich |
| 5,066,737 A | 11/1991 | Job |
| 5,066,738 A | 11/1991 | Ewen |
| 5,077,357 A | 12/1991 | Job |
| 5,082,907 A | 1/1992 | Job |
| 5,096,867 A | 3/1992 | Canich |
| 5,106,806 A | 4/1992 | Job |
| 5,120,867 A | 6/1992 | Welborn, Jr. |
| 5,124,418 A | 6/1992 | Welborn, Jr. |
| 5,132,380 A | 7/1992 | Stevens et al. |
| 5,146,028 A | 9/1992 | Job |
| 5,151,399 A | 9/1992 | Job |
| 5,153,158 A | 10/1992 | Kioka et al. |
| 5,198,401 A | 3/1993 | Turner et al. |
| 5,210,352 A | 5/1993 | Alt et al. |
| 5,229,342 A | 7/1993 | Job |
| 5,229,478 A | 7/1993 | Floyd et al. |
| 5,247,031 A | 9/1993 | Kioka et al. |
| 5,247,032 A | 9/1993 | Kioka et al. |
| 5,264,405 A | 11/1993 | Canich |
| 5,272,236 A | 12/1993 | Lai et al. |
| 5,278,119 A | 1/1994 | Turner et al. |
| 5,278,264 A | 1/1994 | Spaleck et al. |
| 5,278,272 A | 1/1994 | Lai et al. |
| 5,290,745 A | 3/1994 | Jorgensen et al. |
| 5,304,614 A | 4/1994 | Winter et al. |
| 5,324,800 A | 6/1994 | Welborn, Jr. et al. |
| 5,347,025 A | 9/1994 | Yamada et al. |
| 5,350,723 A | 9/1994 | Neithamer et al. |
| 5,384,299 A | 1/1995 | Turner et al. |
| 5,391,789 A | 2/1995 | Rohrmann |
| 5,391,790 A | 2/1995 | Rohrmann et al. |
| 5,399,636 A | 3/1995 | Alt et al. |
| 5,408,017 A | 4/1995 | Turner et al. |
| 5,442,019 A | 8/1995 | Agapiou et al. |
| 5,455,366 A | 10/1995 | Rohrmann et al. |
| 5,487,938 A | 1/1996 | Spencer et al. |
| 5,491,207 A | 2/1996 | Hoel |
| 5,534,473 A | 7/1996 | Welch et al. |
| 5,539,124 A | 7/1996 | Etherton et al. |
| 5,542,199 A | 8/1996 | Dreisbach et al. |
| 5,554,775 A | 9/1996 | Krishnamurti et al. |
| 5,621,126 A | 4/1997 | Canich et al. |
| 5,672,666 A | 9/1997 | Muhle et al. |
| 5,684,098 A | 11/1997 | Wang et al. |
| 5,693,730 A | 12/1997 | Kuber et al. |
| 5,698,634 A | 12/1997 | Yasuda et al. |
| 5,710,297 A | 1/1998 | Weller et al. |
| 5,712,354 A | 1/1998 | Boncella et al. |

(Continued)

FOREIGN PATENT DOCUMENTS

EP  0 093 500 A1  11/1983

(Continued)

OTHER PUBLICATIONS

Read et al., "The Shell Bitumen Handbook," Fifth Edition, 2004, American Society of Civil Engineers (Thomas Telford, Ltd.).

*Primary Examiner* — Robert D. Harlan
(74) *Attorney, Agent, or Firm* — Jones Day

(57) ABSTRACT

This invention relates to bituminous compositions comprising an interpolymer and a bituminous material and methods of making and using same. The interpolymer may comprise ethylene, at least one alpha-olefin, and, optionally, at least one diene and the interpolymer is derived from polymer particles having a surface coating comprising a partitioning agent. Methods of making and using the bituminous compositions are also described.

33 Claims, 1 Drawing Sheet

U.S. PATENT DOCUMENTS

| | | |
|---|---|---|
| 5,714,427 A | 2/1998 | Winter et al. |
| 5,714,555 A | 2/1998 | Chabrand et al. |
| 5,728,641 A | 3/1998 | Aida et al. |
| 5,728,839 A | 3/1998 | Herrmann et al. |
| 5,753,577 A | 5/1998 | Hamura et al. |
| 5,767,209 A | 6/1998 | McNally |
| 5,770,664 A | 6/1998 | Okumura et al. |
| 5,770,753 A | 6/1998 | Kuber et al. |
| 6,268,444 B1 | 7/2001 | Klosin et al. |
| 6,414,056 B1 | 7/2002 | Puzic et al. |
| 6,420,507 B1 | 7/2002 | Kale et al. |
| 6,805,738 B2 | 10/2004 | Tasaki |
| 6,815,510 B2 | 11/2004 | Rouse et al. |
| 2005/0140049 A1 | 6/2005 | James et al. |
| 2006/0243163 A1 | 11/2006 | Martin |
| 2006/0249049 A1 | 11/2006 | Martin |

FOREIGN PATENT DOCUMENTS

| | | |
|---|---|---|
| EP | 0 201 167 B1 | 10/1989 |
| EP | 0 338 336 * | 10/1989 |
| EP | 0 338 336 A1 | 10/1989 |
| EP | 0 420 436 A1 | 4/1991 |
| EP | 0 485 822 A2 | 5/1992 |
| EP | 0 485 823 A1 | 5/1992 |
| EP | 0 518 092 A2 | 12/1992 |
| EP | 0 520 732 A1 | 12/1992 |
| EP | 1 178 996 B1 | 3/1993 |
| EP | 0 591 756 A2 | 4/1994 |
| EP | 0 743 324 A2 | 11/1996 |
| EP | 0 071 820 A1 | 5/1997 |
| EP | 0 775 719 A2 | 5/1997 |
| EP | 0 946 574 A1 | 6/1998 |
| EP | 1 561 771 A1 | 8/2005 |
| WO | WO 91/04257 A1 | 4/1991 |
| WO | WO 92/00333 A2 | 1/1992 |
| WO | WO 93/08199 A1 | 4/1993 |
| WO | WO 93/08221 A2 | 4/1993 |
| WO | WO 94/01471 A1 | 1/1994 |
| WO | WO 96/20233 A1 | 7/1996 |
| WO | WO 97/15582 A1 | 5/1997 |
| WO | WO 97/19959 A1 | 6/1997 |
| WO | WO 97/46567 A1 | 12/1997 |
| WO | WO 98/01455 A1 | 1/1998 |
| WO | WO 98/06759 A1 | 2/1998 |
| WO | WO 98/11144 A1 | 3/1998 |
| WO | WO 00/43608 A1 | 7/2000 |

* cited by examiner

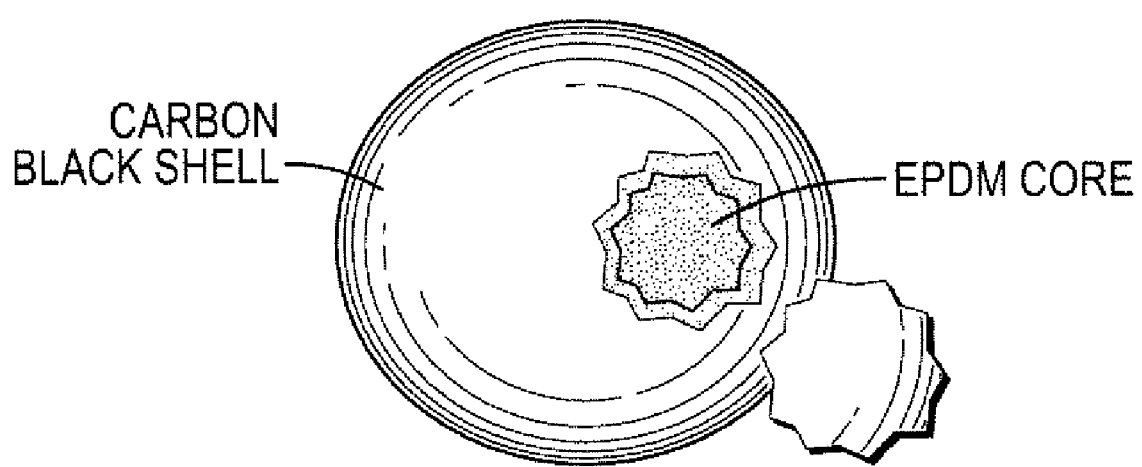

US 7,981,517 B2

BITUMINOUS COMPOSITIONS AND METHODS OF MAKING AND USING SAME

FIELD OF THE INVENTION

This invention relates to compositions comprising an interpolymer and a bituminous material and methods of making and using same. The interpolymer may comprise ethylene, at least one alpha-olefin, and, optionally, at least one diene. In some embodiments, the interpolymer is derived from polymer particles having a surface coating comprising a partitioning agent.

BACKGROUND AND SUMMARY OF THE INVENTION

Generally, bitumen is a viscous, black and sticky organic liquid that may be soluble in carbon disulfide. In some instances, bitumen can be obtained as a mixture of condensed polycyclic aromatic hydrocarbons by fractional distillation of crude oil. Bitumen is generally the fraction with the highest boiling points from the fractional distillation. In some instances, bituminous materials, such as asphalt, can comprise bitumen and at least one other substance, such as an additive.

There are many applications for bitumen and/or various asphalt compositions. For example, they can be used for waterproofing products or articles, such as roofs, buildings, boats, shingles, roofing felts, roofing sheets or roofing membranes, as well as for paving roads, rail beds, runways, running tracks, greenway trails, playgrounds, bicycle and golf cart paths, racetracks, basketball and tennis courts, driveways, subdivision roads, animal feed lots, poultry house floors, barn floors, greenhouse floors, work sites, log yards, ports, freight yards, landfill caps and the like. Furthermore, bitumen and various asphalt compositions can be used in fish hatcheries, reservoir liners, industrial retention ponds, sea walls, dikes and groins.

Bitumen and asphalt can be modified chemically or physically for various applications, each of which requires certain desirable properties. For example, modified bitumen (MB) is bitumen modified by additives to give it plastic or rubber-like properties. Some modified bitumen sheets or membranes can be used in low slope roofing for commercial and large buildings. Modified bitumen may also be utilized in roofing sheets or waterproofing membranes.

Asphalt shingles are generally the primary roofing materials for residential graded roofs. Asphalt shingles may comprise either organic felt materials or glass fiber reinforcing mats which are saturated or encapsulated with bitumen or asphalt to make them waterproof. In general, asphalt shingles are for steep slope roofing whereas modified bitumen membranes are for low slope roofing.

The largest use of bitumen or asphalt is for making asphalt concrete for paving roads. Such use accounts for approximately 80% of the asphalt consumed in the United States. Roofing accounts for most of the remaining asphalt consumption. Asphalt concrete generally comprises a bituminous binder, limestone aggregate, and sand matrix. Mastic asphalt, which can also be used for paving roads, differs from asphalt concrete in that the former has a higher bitumen content that the latter. Generally, mastic asphalt contains about 7-10 wt. % of bitumen, whereas asphalt concrete has about 5 wt. % of bitumen. Another asphalt useful for paving roads is stone mastic asphalt, which is becoming popular because of its high anti skid qualities and improved durability.

Attempts have been made to mix bitumen and asphalt with a wide range of polymers for various applications including roofing and paving. Such polymers include atactic polypropylene (APP) and styrene block copolymers (SBS) (e.g., styrene-butadiene-styrene (SEBS), styrene-isoprene-styrene (SIS), and styrene-ethylene-butadiene-styrene block copolymers (SEBS)). Unfortunately, it takes a relatively long time to process or dissolve the above-mentioned polymers in bituminous materials such as bitumen or various asphalt compositions. Further, these polymer modifiers can be degraded or aged by heat, UV light, weather or a combination thereof. Attempts have also been made to mix rubbers such as EPDM with asphalts. See, e.g., U.S. Pat. Nos. 4,069,181; 4,738,997 and EP Patent Nos. 0338336 A1; 02011671B1; and 0093500 A1. Additional rubber compositions are described in U.S. Pat. Nos. 3,873,483; 4,129,542; 6,414,056; U.S. Publication Nos. 2006/0243163; 2006/0249049; and European Application No. EP 0775719 A2. Unfortunately, the mixing often proves difficult.

Therefore, there is a need to develop new polymer compositions for improving the heat and UV stabilities properties of bituminous materials for various applications including roofing and paving. Further, there is a need to reduce the time required to process or dissolve polymers in the bituminous materials and facilitate mixing to form a stable product.

The present invention meets at least the aforementioned needs and in one embodiment provides a composition comprising ethylene/alpha-olefin interpolymer and a bituminous material, wherein the interpolymer optionally comprises at least one diene. The interpolymer is typically derived from polymer particles having a surface coating comprising a partitioning agent wherein the mean particle size of the polymer particles is less than about 3 mm. The present invention also provides a process for preparing a composition, wherein the process comprises dissolving an ethylene/alpha-olefin interpolymer, wherein the interpolymer optionally comprises at least one diene, in a bituminous material. The interpolymer is typically derived from polymer particles that have a surface coating comprising a partitioning agent wherein the mean particle size of the polymer particles is less than about 3 mm. The present invention also provides a process for preparing an article, wherein the process comprises dissolving an interpolymer comprising ethylene, at least one alpha-olefin, and at least one diene in a bituminous material. In another embodiment, one or more of the unreacted double bonds in the interpolymer are further chemically modified in situ in the process to produce the article.

BRIEF DESCRIPTIONS OF THE DRAWINGS

FIG. 1 is a sketch of a polymer particle, e.g. EPDM, having a surface coating, e.g. carbon black, that is employable in the compositions of the present invention.

DETAILED DESCRIPTION OF THE INVENTION

Provided herein are compositions that can satisfy the aforementioned needs, wherein the compositions comprise an interpolymer and a bituminous material. In some embodiments, the interpolymer comprises ethylene, at least one alpha-olefin, and, optionally, at least one diene. In other embodiments, the interpolymer is derived from polymer particles having a surface coating comprising a partitioning agent.

In some embodiments, the interpolymer disclosed herein exhibits fast dissolution in the bituminous material. In other embodiments, the compositions disclosed herein exhibit improved heat and UV stabilities. In further embodiments, the compositions disclosed herein exhibit improved weatherability and/or lower volatile organics emission. Also provided herein are methods of using the compositions in various applications such as paving roads, runways, railway, paths and floors; and waterproofing shingles, sheets or membranes for roofs.

Also provided herein are compositions comprising an interpolymer and a bituminous material, wherein the interpolymer comprises ethylene, at least one alpha-olefin, and, optionally, at least one diene, and wherein the interpolymer is derived from polymer particles having a surface coating comprising a partitioning agent. In some embodiments, the composition is subject to a thermal or chemical treatment.

In some embodiments, the polymer particles are prepared by polymerizing the ethylene, at least one alpha-olefin, and, optionally at least one diene in the presence of a catalyst and the partitioning agent in at least one fluidized bed reactor. In other embodiments, the catalyst is a Ziegler-Natta or a single site catalyst. In further embodiments, the catalyst is a constrained geometry or metallocene catalyst.

In some embodiments, the interpolymer comprises a diene, and wherein the amount of ethylene is from about 40 wt. % to about 80 wt. %, based on the total weight of polymerizable monomers, the amount of the α-olefin is from about 20 wt. % to about 60 wt. %, based on the total weight of polymerizable monomers, and the amount of the diene is from about 0.5 wt. % to about 15 wt. %, based on the total weight of polymerizable monomers. In further embodiments, the monomeric unit of the diene is further reacted with a crosslinking agent. In further embodiments, the α-olefin is propylene and the diene is ethylidene norbornene.

In some embodiments, the amount of the partitioning agent is from about 10 wt. % to about 50 wt. %, preferably from about 15 wt. % to about 40 wt. % based on the total weight of the polymer particles and the partitioning agent. In other embodiments, the partitioning agent is selected from the group consisting of carbon black, graphite, silica, alumina, alumina silicate, kaolin, clay, di-2-ethylhexyl phthalate, a metal stearate, and combinations thereof. In further embodiments, the partitioning agent is carbon black.

In some embodiments, the mean particle size of the polymer particles is less than about 3 mm, preferably less than about 2 mm, more preferably less than about 1 mm. In other embodiments, the mean particle size of the polymer particles is from about 0.001 mm to about 50 mm. As used herein the mean particle size is determined by ASTM D 1921-06 Method A or other parameters.

In further embodiments, the polymer particles have a polymer Mooney viscosity from about 20 to about 200. For a carbon black coated EAODM (preferably an EPDM) interpolymer, the Mooney viscosity [MV (ML1+4 at 125° C.)] for the neat interpolymer (no carbon black and no oil) can be determined, by one skilled in the art, by one of two methods as described below. The following methods are in reference to carbon black coated interpolymers, however, one skilled in the art could use similar methods for other types of fillers.

Method 1 For a carbon black coated interpolymer, preferably with no oil (INT A) that has a measured viscosity less than 100 [MV (ML1+4 at 125° C.)], the measured Mooney viscosity of the neat interpolymer is determined from a calibration curve as follows. The amount of carbon black in the polymerized INT A interpolymer can be determined gravimetrically by selective ashing of the polymer additives, and, if present, oil, in a manner to leave the carbon black intact.

A neat interpolymer, corresponding in chemical make-up to the interpolymer of interest, and prepared from the same or similar catalyst system, and of known Mooney viscosity [MV (ML1+4 at 125° C.)], is melt blended with various levels of carbon black to form a range of carbon black coated interpolymers. Melt blending can be done in a Brabender mixer. The carbon black used is the same as that in the interpolymer of interest (INT A). The Mooney viscosity [MV (ML1+4 at 125° C.)] is measured for each sample, and a calibration curve is generated, showing the measured Mooney viscosity as a function of amount of carbon black. A series of such calibration curves are generated for several neat interpolymers of varying viscosities. The data from the generated calibration curves is entered into a regression program, such as an EXCEL regression program, and the following information is generated: a coefficient for the carbon black level, a coefficient for the measured Mooney viscosity, and an intercept.

The Mooney viscosity [MV (ML1+4 at 125° C.)] of the neat interpolymer (INT A) can be calculated using the data generated from the regression analysis, the known level of carbon black in the interpolymer (INT A), and the measured Mooney viscosity [MV (ML1+4 at 125° C.)] of the interpolymer (INT A).

Method 2 For a carbon black coated interpolymer, preferably with no oil (INT B), that has a measured viscosity greater than 100 [MV (ML1+4 at 125° C.)], the measured Mooney viscosity is determined from a calibration curve as follows. The amount of carbon black in the polymerized INT B interpolymer can be determined gravimetrically by selective ashing of the polymer additives, and, if present, oil, in a manner to leave the carbon black intact.

A neat interpolymer, corresponding in chemical make-up to the interpolymer of interest, and prepared from the same or similar catalyst system, and of known Mooney viscosity, is melt blended with a fixed amount of carbon black (for example, from 40 to 60 phr carbon black, based on hundred parts interpolymer) and a fixed amount of an oil (for example, from 60 to 80 phr oil, based on hundred parts interpolymer) to form a first sample. The carbon black is the same as that in the interpolymer of interest (INT B). Additional samples are formed, each having an interpolymer of different Mooney viscosity, and each having the same amount of both carbon black and oil, The Mooney viscosity [MV (ML1+4 at 125° C.)] is measured for each sample. A calibration curve is generated, showing the measured Mooney viscosity [MV (ML1+4 at 125° C.)] as a function of the Mooney viscosity [MV (ML1+4 at 125° C.)] of the neat interpolymer.

The carbon-black coated interpolymer (INT B) of interest is next compounded with additional carbon black to achieve a final carbon black level as that used in the samples for calibration, as discussed above. Also the INT B interpolymer is compounded with the same oil, and at the same oil level, as that used in the samples for calibration as discussed above, to form a "modified INT B" interpolymer. The Mooney viscosity [MV (ML1+4 at 125° C.)] of the modified INT B interpolymer is measured. The Mooney viscosity of the neat interpolymer can be then calculated using the calibration curve as described above.

In further embodiments, the interpolymer has a crystallinity of from about 0 to about 25%, as determined by DSC. Differential Scanning Calorimetry (DSC) can be used to measure crystallinity in ethylene-based samples. About five to eight mg of polymer is weighed, and placed in a DSC pan. The lid is crimped on the pan to ensure a closed atmosphere. The sample pan is placed in a DSC cell, and then heated, at a rate of approximately 10° C./min, to a temperature of 180° C. for PE. The sample is kept at this temperature for three minutes. Then the sample is cooled at a rate of 10° C./min to −60° C. for PE, and kept isothermally at that temperature for three minutes. The sample is next heated at a rate of 10° C./min until complete melting (second heat). The percent crystallinity is calculated by dividing the heat of fusion ($H_f$), determined from the second heat curve, by a theoretical heat of fusion of 292 J/g for PE, and multiplying this quantity by 100 (for example, % cryst.=($H_f$/292 J/g)×100 (for PE)). Unless otherwise stated, melting point(s) ($T_m$) of each polymer sample is determined from the second heat curve obtained from DSC, as described above. The crystallization temperature ($T_c$) is measured from the first cooling curve.

In some embodiments, the composition further comprises an additive. In other embodiments, the additive is selected from the group consisting of polymers, aggregates, fillers, heat stabilizers, UV stabilizers, antioxidants, lubricants, solvents, extenders, plasticizers, emulsifiers, reinforcing agent, crosslinking agents, compatibilizing agents, and combinations thereof. In one embodiment a particularly preferable additive is SBS.

In further embodiments, the aggregate is selected from the group consisting of carbon black, graphite, and inorganic aggregates such as clays, sands, pebbles, stones, crushed rocks, talc, kaolin, dolomite, calcium carbonate, calcium sulfate, silica, aluminum silicate, alumina, hydrated alumina, mica, wollastonite, feldspar, ceramic, glass, barite and combinations thereof. In some embodiments, the additive is a polymer.

In some embodiments, an inner portion, i.e. non-surface portion that is typically between the core and the surface, of a majority of the polymer particles are substantially free of carbon black. In other embodiments, an inner portion of a majority of the polymer particles comprises an additive.

In some embodiments, the composition is formed by mixing the polymer with the bituminous material, and wherein the polymer is not substantially degraded during the mixing. In further embodiments, the composition may be stored at a temperature greater than 100° C. for greater than one hour, without a substantial increase in gel formation.

Also provided herein are processes for preparing a composition, wherein the process comprises dissolving an interpolymer comprising ethylene, at least one alpha-olefin, and, optionally, at least one diene in a bituminous material, and wherein the interpolymer is derived from polymer particles that have a surface coating comprising a partitioning agent.

Also provided herein are articles comprising at least one component formed from the composition disclosed herein.

Also provided herein are waterproof sheets or membranes comprising a layer which comprises the composition disclosed herein. In some embodiments, the waterproof sheets or membranes further comprise a second layer and a support. In further embodiments, the support comprises paper, felt, glass fibers or a combination thereof. In other embodiments, the waterproof sheets or membranes further comprise inorganic granules.

Also provided herein are processes of paving a road comprising heating the composition disclosed herein, and applying the heated composition to a road surface. In some embodiments, the composition further comprises inorganic granules. In other embodiments, the interpolymer in the composition is not substantially degraded.

Also provided herein are processes for preparing an article, wherein the process comprises dissolving an interpolymer comprising ethylene, at least one alpha-olefin, and at least one diene in a bituminous material, and wherein one or more of the unreacted double bonds in the interpolymer further chemically modified in situ in the process to produce the article.

Also provided herein are articles comprising at least one component formed from the composition disclosed herein.

Also provided herein are processes where the interpolymer of the compositions disclosed herein is stored at a temperature of greater than 100° C. for longer than about one hour without the loss in performance relative to the un-stored polymer containing mixture.

General Definitions

"Composition", as used herein, includes a mixture of materials which comprise the composition, as well as reaction products and decomposition products formed from the materials of the composition.

"Polymer" refers to a polymeric compound prepared by polymerizing monomers, whether of the same or a different type. The generic term "polymer" embraces the terms "homopolymer," "copolymer," "terpolymer" as well as "interpolymer."

"Interpolymer" refers to a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

"Crystalline" refers to a polymer that possesses a first order transition or crystalline melting point ($T_m$) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

A composition that is "substantially free" of an element or a compound means that the composition contains less than 20 wt. %, less than 10 wt. %, less than 5 wt. %, less than 4 wt. %, less than 3 wt. %, less than 2 wt. %, less than 1 wt. %, less than 0.5 wt. %, less than 0.1 wt. %, or less than 0.01 wt. % of the element or compound, based on the total weight of the composition.

A polymer or interpolymer that is "substantially degraded" means that the molecular weight of the polymer or interpolymer is decreased by more than about 10%, more than about 20%, more than about 30%, more than about 40%, more than about 50%, more than about 60%, more than about 70%, more than about 80%, more than about 90%, more than about 95%, or more than about 99%, based on the original molecular weight of the polymer or interpolymer.

"Asphalt" is a brownish to blackish cementitious material which is typically solid or semisolid in consistency and comprises bitumens which occur naturally or are obtained as residua in petroleum refining. Asphalt is typically heated and poured into, onto, or otherwise mixed with an aggregate.

"Bitumen" is typically a mixture comprising parafinnic and aromatic hydrocarbons and heterocyclic compounds containing sulfur, nitrogen, and oxygen. Bitumens are typically solid to viscous, semi-solid liquids and are usually soluble in, for example, carbon disulfide.

"Bituminous material" refers to any material that comprises bitumen. Some non-limiting examples of bituminous materials include bitumen itself and various asphalts. Asphalts generally comprise bitumen and at least another substance such as polymers, aggregates, fillers, stabilizers, antioxidants, solvents, extenders, plasticizers, emulsifiers, crosslinking agents, compatibilizing agent, combinations thereof, and the like.

"Pavement" refers to the durable surface for an area generally capable of sustaining traffic, which can be either vehicular or foot traffic and includes, for example, roadways, sidewalks, aviation runways, taxiways, etc.

"Paving" refers to the process of applying asphalt, recycled asphalt, concrete, or asphalt concrete to the surface of a piece of land such as a pavements or a floor. In some embodiments, paving comprises laying a hot asphalt composition with a paving machine on a road surface.

"Waterproofing" refers to the process of making a building component totally resistant to the passage of water and/or water vapor.

Disclosed herein are compositions comprising an interpolymer and a bituminous material. In some embodiments, the interpolymer comprises ethylene, at least one alpha-olefin, and, optionally, at least one diene. In other embodiments, the interpolymer comprises repeating units derived from ethylene, at least one alpha-olefin, and, optionally, at least one diene. In further embodiments, the interpolymer is derived from polymer particles having a surface coating comprising a partitioning agent. Optionally, the compositions further comprise at least an additive, another polymer or a combination thereof.

In some embodiments, the bituminous material is or comprises bitumen. Bitumen is generally obtained by fractional distillation of crude oils at atmospheric pressure or reduced pressure. Bitumen is generally the residue remaining after removal of volatile constituents of the crude oils. Bitumen can also be derived from propane bitumen, butane bitumen, pentane bitumen or a combination thereof. In some embodiments, bitumen is generally a mixture of organic liquids that are highly viscous, black, sticky, and entirely soluble in carbon disulfide. In other embodiments, bitumen comprises condensed polycyclic aromatic hydrocarbons.

Bitumen can be classified by penetration grade. The penetration of a bituminous material can be determined according to ASTM D 5-06, which is incorporated herein by reference. The penetration of the bitumen sample is a measure of its resistance to deformation and is the depth expressed in 0.1 mm. In measuring the penetration, a needle of standardized dimensions penetrates into the sample under standardized conditions.

The penetration index (PI) of a bituminous material is a measure of the temperature susceptibility of the penetration of the material and is calculated from the slope of the decimal logarithm of the penetration versus the temperature in ° C. The PI can be defined as (20-500 m) (1+50 m) where m is the slope of the decimal logarithm of the penetration versus temperature. In general, the higher the PI, the lower is the temperature susceptibility.

In some embodiments, the bitumen material has a penetration value ranging from about 1 dmm to about 500 dmm, from about 2.5 dmm to about 300 dmm, or from about 5 dmm to about 200 dmm, as measured by ASTM D 5-06 at 25° C., In other embodiments, the bitumen material has a softening point ranging from about 25° C. to about 80° C., from about 30° C. to about 75° C. from about 35° C. to about 70° C., or from about 40° C. to about 65° C., as measured by ASTM D 36-06, which is incorporated herein by reference.

Raw bitumen can be further processed to various bituminous materials suitable for preparing the compositions disclosed herein. In some embodiments, the bituminous material is an oxidized asphalt obtained from blowing air into a bitumen. In some embodiments, the bitumen is a soft bottom bitumen or a reconstituted asphalt obtained by blending distillates or extracts with hard asphalts or residuals (e.g. precipitated asphaltenes). In other embodiments, the bitumen is a residue from distillation of crude oil, a cracked residue, an extract of a crude oil, a bitumen derived from propane bitumen, butane bitumen, pentane bitumen or combinations thereof. The blowing process can occur in the presence of a catalytic. Some non-limiting examples of suitable catalysts include ferric chloride, phosphorus pentoxide, aluminium chloride, boric acid, phosphoric acid and combinations thereof. The blowing process can be carried out with an oxygen-containing gas, such as air or pure oxygen.

In some embodiments, the bitumen material is an anionic emulsified asphalt obtained by mixing bitumen or asphalt with an anionic emulsifier. In other embodiments, the bitumen material is a cationic emulsified asphalt obtained by mixing bitumen or asphalt with a cationic emulsifier. In this manner the compositions of the present invention may be made into the form of an emulsion. One manner of doing so is add the emulsifier to molten asphalt and/or employ a pressurized vessel. The polymer particles can then be mixed using, for example, a high speed mixer. In further embodiments, the bitumen material is an asphalt concrete which comprises a bituminous binder, limestone aggregate, and sand matrix. In certain embodiments, the bitumen material is a mastic asphalt having a bitumen content of about 7 wt. % to about 10 wt. % of the total weight. In further embodiments, the bitumen material is a stone mastic asphalt.

The type, specifications and manufacture methods of bitumen materials are disclosed in literature, such as the book edited by John Read et al. entitled "*The Shell Bitumen Handbook,*" Filth Edition, 2004, American Society of Civil Engineers (Thomas Telford, Ltd.), which is incorporated herein by reference in its entirety.

The interpolymer of the composition disclosed herein can be prepared by polymerizing any combination of ethylene, at least one alpha-olefin monomer, and optionally, at least one diene monomer. A skilled artisan can readily select appropriate monomer combinations for any desired interpolymer. In some embodiments, the polymerization occurs in the presence of a Ziegler-Natta or single-site catalyst. In other embodiments, the polymerization occurs in the presence of a metallocene or constrained geometry catalyst.

In some embodiments, the interpolymer is derived from polymer particles prepared by a gas phase polymerization in at least one fluidized bed reactor using at least one partitioning or fluidization agent. Some non-limiting examples of partitioning agents include carbon black, graphite, silica, alumina, alumina silicate, kaolin, clay, di-2-ethylhexyl phthalate, a metal stearate, and mixtures thereof.

In some embodiments, the partitioning agent is carbon black. In certain embodiments, the amount of the partitioning agent is from about 5 wt. % to about 50 wt. % from about 15 wt. % to about 45 wt. % or from about 20 wt. % to about 40 wt. %, based on the total weight of the polymer particles and the partitioning agent. In other embodiments, the polymer particles have a surface coating comprising the partitioning agent. In further embodiments 100%, more than about 95%, more than about 90%, more than about 85%, more than about 80%, more than about 75%, more than about 70%, more than about 65%, more than about 60%, more than about 55%, more than about 50%, more than about 45%, or more than about 40% of the partitioning agent is in the surface coating.

In some embodiments, an inner portion of a majority of the polymer particles are substantially free of a partitioning agent such as carbon black. In some embodiments, an inner portion of a majority of the polymer particles comprises an additive selected from the group consisting of polymers, aggregates, fillers, heat stabilizers, UV stabilizers, antioxidants, lubricants, solvents, extenders, plasticizers, emulsifiers, compatibilizing agents, reinforcing agent, crosslinking agents and combinations thereof.

In some embodiments, the interpolymer is derived from polymer particles prepared by a gas phase polymerization of a mixture of ethylene, one $C_{1-20}$ alpha-olefin, and, optionally, one diene. The alpha-olefin may be either an aliphatic or an aromatic compound and may contain vinylic unsaturation or a cyclic compound, such as cyclobutene, cyclopentene, or norbornene, including norbornene substituted in the 5 or 6 position with a $C_{1-20}$ hydrocarbyl group. In some embodiments, the alpha-olefin is a $C_{1-20}$ aliphatic olefin, a $C_{3-10}$ aliphatic olefin or a $C_{3-8}$ aliphatic olefin. In other embodiments, the alpha-olefin includes, but is not limited to, propylene, isobutylene, 1-butene, 1-pentene, 1-hexene, 3-methyl-1-pentene, 4-methyl-1-pentene, 1-octene, 1-decene, 1-dodecene and combinations thereof. In further embodiments, the alpha-olefin is propylene, 1-butene, 1-hexene, 1-octene or a combination thereof. In further embodiments, the alpha-olefin is propylene. The alpha-olefin content of the interpolymer can range from about 10 wt. % to about 90 wt. %, from about 20 wt. % to about 85 wt. %, from about 30 wt. % to about 80 wt. %, or from about 40 wt. % to about 75 wt. %, based on the total weight of the polymerizable monomers.

The diene monomer can be any diene suitable for copolymerizing with ethylene and alpha-olefins. In some embodiments, the diene is a non-conjugated diene. The non-conjugated diene can be a straight chain, branched chain or cyclic hydrocarbon diene. Some non-limiting examples of suitable non-conjugated dienes include linear dienes such as 1,4-hexadiene, 1,5-hexadiene, 1,6-octadiene, and 1,9-decadiene; branched chain acyclic dienes such as 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, and mixed isomers of dihydromyrcene; single ring alicyclic dienes such as 174-cyclohexadiene, 1,5-cyclooctadiene and 1,5-cyclododecadiene; multi-ring alicyclic fused and bridged ring dienes such as tetrahydroindene, methyl tetrahydroindene, dicyclopentadiene (DCPD), bicyclo-(2,2,1)-hepta-2,5-diene (norbornadiene or NBD), methyl norbornadiene; and alkenyl, alkylidene, cycloalkenyl and cycloalkylidene norbornenes such as 5-methylene-2-norbornene (MNB), 5-ethylidene-2-norbornene (ENB), 5-vinyl-2-norbornene (VNB), 5-propenyl-2-norbornene, 5-isopropylidene-2-norbornene, 5-(4-cyclopentenyl)-2-norbornene and 5-cyclohexylidene-2-norbornene. In other embodiments, the diene is a conjugated diene. Some non-limiting examples of suitable conjugated dienes include 1,3-pentadiene, 1,3-butadiene, 2-methyl-1,3-butadiene, 4-methyl-1,3-pentadiene, and 1,3-cyclopentadiene.

In some embodiments, the diene is a non-conjugated diene selected from ENB, VNB, and NBD. In other embodiments, the non-conjugated diene is selected from ENB and VNB. In further embodiments, the non-conjugated diene is ENB. The diene monomer content can range from greater than 0 to about 20 wt. %, from greater than 0 to about 15 wt. %, from greater than 0.3 wt. % to about 12 wt. %, or from greater than 0.5 wt. % to about 10 wt. %, based on total weight of the polymerizable monomers.

In some embodiments, the interpolymer comprises from about 40 wt. % to about 80 wt. % of ethylene, from about 20 wt. % to about 60 wt. % of the α-olefin, and from about 0.5 wt. % to about 15 wt. % of the diene, based on the total weight of the polymerizable monomers. In other embodiments, the interpolymer comprises ethylene, propylene and a diene.

In some embodiments, the interpolymer is derived from polymer particles prepared by the methods disclosed in U.S. Pat. Publication No. 2005/0140049, which is incorporated herein by reference. In other embodiments, the interpolymer or polymer particles are prepared by the gas phase process using a Ziegler-Natta catalyst and a partitioning agent. Any conventional Ziegler-Natta catalyst known to skilled artisans can be used. In other embodiments, the catalyst is a metallocene or single-site or constrained geometry catalyst (CGC). Some non-limiting examples of CGC include those described in U.S. Pat. No. 6,420,507, U.S. Pat. No. 6,268,444 and European patents EP 1 178 996 B1 and EP 0 946 574 B1, all of which are incorporated herein by reference.

Ziegler type catalysts are typified by a transition metal halide supported on magnesium chloride. Generally, a procatalyst; that is a formulation which requires chemical activation to become an active polymerization catalyst, can be described by the generic formulation:

where:
x typically is >1 and <100,
a is >0 and <2,
a+y is 3 or 4,
z is from 0 to 10 or more,
ED is an electron donor,
M is a transition metal, and
R is an aliphatic or aromatic radical.

Although other transition metals, such as vanadium, zirconium and hafnium, can be used in these catalysts, mixtures of transition metals can also be utilized, such as Ti and Hf, Ti and V, Ti and Zr. However, titanium is the predominant transition metal utilized in the vast majority of commercial Ziegler type catalysts.

The "procatalyst" is then further activated by contact with an aluminum compound with reducing power (for example, compounds such as $AlR_nCl_{3-n}$, where R is alkyl group of 1 to 20 carbons, and n ranges from 1.5 to 3). The most typically used aluminum compounds are trialkyl aluminums and dialkyl aluminum halides. This activation may be partial, prior to introduction into the reactor, or completed fully within the polymerization reactor.

The catalyst may be supported further on a substrate, prepared by precipitation, crystallization or even spray dried; however, they all share similar chemistry.

Examples of procatalyst compositions and methods of making such procatalyst compositions are described in: U.S. Pat. Nos. 5,487,938; 5,290,745; 5,247,032; 5,247,031; 5,229,342; 5,153,158; 5,151,399; 5,146,028; 5,106,806; 5,082,907; 5,077,357; 5,066,738; 5,066,737; 5,034,361; 5,028,671; 4,990,479; 4,927,797; 4,829,037; 4,816,433; 4,547,476; 4,540,679; 4,460,701; and 4,442,276; the contents of each of these patents are incorporated herein, in their entirety, by reference.

Most preferred transition metal compounds are titanium halides and haloalcoholates having 1 to 8 carbon atoms per alcoholate group. Examples of such compounds include: $TiCl_4$, $TiBr_4$, $TiI_4$, $TiCl_3$, $Ti(OCH_3)Cl_3$, $Ti(OC_4H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})_2Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Mixtures of titanium compounds can be employed if desired.

The magnesium compounds include magnesium halides, such as $MgCl_2$, $MgBr_2$, and $MgI_2$. Anhydrous $MgCl_2$ is a preferred compound.

The electron donor is an organic Lewis base, liquid at temperatures in the range of 0° C. to 200° C., in which the magnesium and titanium compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethanol, 1-butanol, ethyl formate, methyl acetate, ethyl anisate, ethylene carbonate, tetrahydropyran, and ethyl propionate.

While an excess of electron donor is used initially to provide the reaction product of titanium compound and electron donor, the reaction product finally contains 1 to 20 moles of electron donor per mole of titanium compound, and preferably 1 to 10 moles of electron donor per mole of titanium compound.

The procatalyst activator compound used in the partial pre-activation step can be one compound or a mixture of two different compounds. Each compound can have the formula M(Rn)X (3−n) wherein M is Al or B; each X is, independently, chlorine, bromine, or iodine; each R is, independently, a saturated aliphatic hydrocarbon radical having 1 to 14 carbon atoms, provided that when M is Al, n is 1 to 3, and when M is B, n is 0 to 1.5. Examples of the R radical are methyl, ethyl, n-butyl, isobutyl, n-hexyl and n-octyl. Examples of n when M is aluminum, are 1, 1.5, 2 and 3. Examples of n when M is boron, are 0, 1 or 1.5. Preferred activator compounds include diethyl aluminum chloride, triethyl aluminum, tri-n-hexyl aluminum, dimethyl aluminum chloride, and tri-n-octyl aluminum. Particularly preferred activator compounds are: a sequential mixture of tri-n-hexylaluminum and diethylaluminum chloride; a sequential mixture of triethylaluminum and diethylaluminum chloride; a sequential mixture of diethylaluminum chloride and tri-n-hexylaluminum; a sequential mixture of diethylaluminum chloride and triethylaluminum; and either diethyl aluminum chloride or tri-n-hexyl aluminum.

The partially activated catalyst can function as a polymerization catalyst, but at greatly reduced and commercially unsuitable catalyst productivity. Complete activation in the polymerization reactor by additional cocatalyst is required to achieve full activity. Alternately, the catalyst may be fully activated in the polymerization reactor.

The cocatalyst, generally a hydrocarbyl aluminum cocatalyst, can be represented by the formula $R_3Al$ or $R_2AlX$, wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum hydride, di-isobutyl-hexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, diisobutylaluminum chloride, and ethylaluminum sesquichloride. Cocatalyst is introduced in a sufficient amount to provide, in addition to the molar ratio of activator to titanium mentioned above, a cocatalyst to titanium mole ratio of 10:1 to 100:1, preferably 20:1 to 50:1. This amount will complete the activation of the precursor.

In those cases where it is desired to support the procatalyst, silica is the preferred support. Other suitable supports are inorganic oxides, such as aluminum phosphate, alumina, silica/alumina mixtures, silica modified with an organoaluminum compound, such as triethylaluminum, and silica modified with diethyl zinc. A typical support is a solid, particulate, porous material, essentially inert to the polymerization. It is used as a dry powder having a mean particle size of 10 to 250 microns, and preferably 10 to 100 microns; a surface area of at least 200 square meters per gram, and preferably at least 250 square meters per gram; and a pore size of at least 100 angstroms and preferably at least 200 angstroms. Generally, the amount of support used is that which will provide 0.1 to 1.0 millimole of titanium per gram of support, and preferably 0.4 to 0.9 millimole of titanium per gram of support. Impregnation of the above mentioned catalyst precursor into a silica support can be accomplished by mixing the precursor and silica gel in the electron donor solvent, or other solvent, followed by solvent removal under reduced pressure. The resultant solid catalyst may then be converted into a free flowing slurry with an aliphatic hydrocarbon as described in U.S. Pat. No. 5,290,745 and European Patent Application 771 820, or may be used as a dry powder. Both the patent and patent application are incorporated herein in their entirety by reference.

As noted, the precursor may be partially activated before polymerization. Activation is completed in the reactor via the cocatalyst. The cocatalyst is preferably added separately neat, or as a solution in an inert solvent, such as isopentane, to the polymerization reactor at the same time as the flow of ethylene is initiated.

These catalysts contain significant amounts of organic species which are bound to the catalyst residues, as well as significant quantities of halogens, particularly chlorides which can cause mold staining and corrosion. The organics must be deactivated and purged out of the polymer before the polymer is suitable for commercial applications. The halogen species likewise need to be sequestered, or rendered inactive, by various additives such as calcium stearate, zinc stearate, or zinc oxide. Water is frequently added to the polymers produced using these catalyst systems to react with the organic residues of the catalyst system and any reactive halogens (that is, free $TiCl_x$ for example) to allow these materials to be purged from the polymer prior to use. Removal of these air and water reactive residues to levels on the order of 100 ppm, remaining in the polymer, is required by governmental regulations.

Single site catalysts, such as metallocene catalysts and constrained geometry catalysts may be used in the practice of the invention. Generally, such catalyst compounds include half and full sandwich compounds having one or more π-bonded ligands including cyclopentadienyl-type structures or other similar functioning structure such as pentadiene, cyclooctatetraendiyl and imides. Typical compounds are generally described as containing one or more ligands capable of π-bonding to a transition metal atom, usually, cyclopentadienyl derived ligands or moieties, in combination with a transition metal selected from Group 3 to 8, preferably 4, 5 or 6 or from the lanthanide and actinide series of the Periodic Table of Elements.

Some metallocene-type catalyst compounds are described in, for example, U.S. Pat. Nos. 4,530,914; 4,871,705; 4,937, 299; 5,017,714; 5,055,438; 5,096,867; 5,120,867; 5,124,418;

5,198,401; 5,210,352; 5,229,478; 5,264,405; 5,278,264; 5,278,119; 5,304,614; 5,324,800; 5,347,025; 5,350,723; 5,384,299; 5,391,790; 5,391,789; 5,399,636; 5,408,017; 5,491,207; 5,455,366; 5,534,473; 5,539,124; 5,554,775; 5,621,126; 5,684,098; 5,693,730; 5,698,634; 5,710,297; 5,712,354; 5,714,427; 5,714,555; 5,728,641; 5,728,839; 5,753,577; 5,767,209; 5,770,753 and 5,770,664; European publications: EP-A-0 591 756; EP-A-0 520 732; EP-A-0 420 436; EP-A-0 485 822; EP-A-0 485 823; EP-A-0 743 324; EP-A-0 518 092; and PCT publications: WO 91/04257; WO 92/00333; WO 93/08221; WO 93/08199; WO 94/01471; WO 96/20233; WO 97/15582; WO 97/19959; WO 97/46567; WO 98/01455; WO 98/06759 and WO 98/011144. Additional metallocene-type catalysts are described in U.S. Pat. Nos. 5,442,019 and 5,672,666. All of these references are incorporated herein, in their entirety, by reference.

Suitable catalysts for use herein, preferably include constrained geometry catalysts as disclosed in U.S. Pat. Nos. 5,272,236; 5,278,272; and 5,132,380, which are each incorporated in their entirety by reference. The monocyclopentadienyl transition metal olefin polymerization catalysts taught in U.S. Pat. No. 5,026,798, the teachings of which are incorporated herein by reference, are also suitable as catalysts of the invention.

The foregoing catalysts may, as described in U.S. Pat. No. 5,278,272, comprise a metal coordination complex comprising a metal of groups 3-10 or the Lanthanide series of the Periodic Table of the Elements, and a delocalized π-bonded moiety substituted with a constrain-inducing moiety, said complex having a constrained geometry about the metal atom, such that the angle at the metal between the centroid of the delocalized, substituted π-bonded moiety, and the center of at least one remaining substituent is less than such angle in a similar complex, containing a similar π-bonded moiety, lacking in such constrain-inducing substituent, and provided further that for such complexes comprising more than one delocalized, substituted x-bonded moiety, only one thereof, for each metal atom of the complex, is a cyclic, delocalized, substituted π-bonded moiety. The catalyst further comprises an activating cocatalyst.

Preferred catalyst complexes correspond to the structure I below:

Structure I

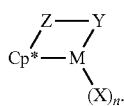

In structure I, M is a metal of group 3-10, or the Lanthanide series of the Periodic Table of the Elements;

Cp* is a cyclopentadienyl or substituted cyclopentadienyl group bound in an η5 bonding mode to M;

Z is a moiety comprising boron, or a member of group 14 of the Periodic Table of the Elements, and optionally sulfur or oxygen, said moiety having up to 20 non-hydrogen atoms, and optionally Cp* and Z together form a fused ring system;

X independently each occurrence is an anionic ligand group or neutral Lewis base ligand group having up to 30 non-hydrogen atoms;

n is 0, 1, 2, 3, or 4 and is 2 less than the valence of M; and

Y is an anionic or nonanionic ligand group, bonded to Z and M, comprising nitrogen, phosphorus, oxygen or sulfur, and having up to 20 non-hydrogen atoms, optionally Y and Z together form a fused ring system.

More specific complexes are described in U.S. Pat. No. 5,278,272, incorporated herein by reference.

Specific compounds include: (tert-butylamido) (tetramethyl-η5-cyclopentadienyl)-1,2-ethanediylzirconium dichloride, (tert-butylamido)(tetramethyl-η5-cyclopentadienyl) 1,2-ethanediyltitanium dichloride, (methylamido)(tetramethyl-η5-cyclopentadienyl)-1,2-ethanediylzirconium dichloride, (methylamido) (tetramethyl-η5 cyclopentadienyl)-1,2-ethanediyltitanium dichloride, (ethylamido)(tetramethyl-η5-cylopentadienyl)-methylenetitanium dichloro, (tertbutylamido)dibenzyl(tetramethyl-η5-cyclopentadienyl) silanezirconium dibenzyl, (benzylamido)dimethyl(tetramethyl-η5-cyclopentadienyl)silanetitanium dichloride, (phenylphosphido) dimethyl(tetramethyl η5-cyclopentadienyl) silanezirconium dibenzyl, (tertbutylamido)dimethyl (tetramethyl-η5-cyclopentadienyl)silanetitanium dimethyl.

The complexes may be prepared by contacting a derivative of a metal, M, and a group I metal derivative or Grignard derivative of the cyclopentadienyl compound in a solvent, and separating the salt byproduct. Suitable solvents for use in preparing the metal complexes are aliphatic or aromatic liquids, such as cyclohexane, methylcyclohexane, pentane, hexane, heptane, tetrahydrofuran, diethyl ether, benzene, toluene, xylene, ethylbenzene, etc., or mixtures thereof.

Suitable cocatalysts include polymeric or oligomeric aluminoxanes, especially methyl aluminoxane, as well as inert, compatible, noncoordinating, ion forming compounds. So-called modified methyl aluminoxane (MMAO) is also suitable for use as a cocatalyst. One technique for preparing such modified aluminoxane is disclosed in U.S. Pat. No. 5,041,584, the teachings of which are incorporated herein by reference. Aluminoxanes can also be made as disclosed in U.S. Pat. Nos. 5,542,199; 4,544,762; 5,015,749; and 5,041,585, the entire specification of each of which is incorporated herein by reference. Preferred cocatalysts are inert, noncoordinating, boron compounds.

In some embodiments, the interpolymer or polymer particles have a polymer Mooney viscosity, i.e. polymer without partitioning agent, as measured as described above, of from about 20 to about 200, from about 30 to about 190, from about 40 to about 180, from about 50 to about 170, or from about 60 to about 160. In other embodiments, the mean particle size of the polymer particles is less than about 10 mm, less than about 9 mm, less than about 8 mm, less than about 7 mm, less than about 6 mm, less than about 5 mm, less than about 4 mm, less than about 3 mm, less than about 2 mm, or less than about 1 mm. In further embodiments, the particle size of the polymer particles is from about 0.001 mm to about 50 mm, from about 0.05 mm to about 40 mm, from about 0.1 mm to about 30 mm, or from about 0.5 mm to about 20 mm. In further embodiments, the interpolymer or polymer particles have a crystallinity from about 0 to about 50%, from about 0 to about 40%, from about 0 to about 30%, from about 0 to about 25%, from about 0 to 20%, from about 0 to 15%, or from about 0 to 100, as determined by DSC.

In some embodiments, the compositions disclosed herein further comprise at least an additive. Some non-limiting examples of suitable additives include polymers, aggregates, fillers, heat stabilizers, UV stabilizers, antioxidants, lubricants, solvents, extenders, plasticizers, emulsifiers, reinforcing agent, crosslinking agents, compatibilizing agents, and combinations thereof. The amount of the additives can be in the range from about 1 wt. % to about 95 wt. %, from about 2.5 wt. % to about 90 wt %, from about 5 wt. % to about 85 wt. %, from about 10 wt. % to about 80 wt. %, from about 15 wt. % to about 75 wt. %, based on the total weight of the composition.

Any aggregate known to a person of ordinary skill in the art may be used in the composition disclosed herein. Some non-limiting examples of suitable aggregates include carbon black, graphite, and inorganic aggregates such as clays, sands, pebbles, stones, crushed rocks, talc, kaolin, dolomite, calcium carbonate, calcium sulfate, silica, aluminum silicate, alumina, hydrated alumina, mica, wollastonite, feldspar, ceramic, glass, barite and combinations thereof. The amount of the aggregates can be in the range from about 1 wt. % to about 95 wt. %, from about 2.5 wt. % to about 90 wt. %, from about 5 wt. % to about 85 wt. %, from about 10 wt. % to about 80 wt. %, from about 15 wt. % to about 75 wt. %, based on the total weight of the bitumen material.

The aggregates can be in any shape, form or size suitable for waterproofing and paving applications. In some embodiments, the aggregates are in the form of flake, cylinder, disk, bead, microsphere or irregular powder. In other embodiments, the size of the aggregates varies from about 0.1 microns to about 10 cm, from about 1 microns to about 5 cm, from about 0.1 micron to about 10 microns, from about 10 microns to about 1 mm, from about 1 mm to about 1 cm, or from about 1 cm to about 10 cm.

In some embodiments, the compositions disclosed herein optionally comprise an antioxidant or a stabilizer. Any antioxidant known to a person of ordinary skill in the art may be used in the composition disclosed herein. Non-limiting examples of suitable antioxidants include amine-based antioxidants such as alkyl diphenylamines, phenyl-α-naphthylamine, alkyl or aralkyl substituted phenyl-α-naphthylamine, alkylated p-phenylene diamines, tetramethyl-diaminodiphenylamine and the like; and hindered phenol compounds such as 2,6-di-t-butyl-4-methylphenol; 1,3,5-trimethyl-2,4,6-tris(3',5'-di-t-butyl-4'-hydroxybenzyl)benzene; tetrakis[(methylene(3,5-di-t-butyl-4-hydroxyhydrocinnamate)]methane (e.g., IRGANOX™ 1010, from Ciba Geigy, New York); octadecyl-3,5-di-t-butyl-4-hydroxycinnamate (e.g. IRGANOX™ 1076, commercially available from Ciba Geigy) and combinations thereof. In other embodiments, the amount of the antioxidant in the composition can be from about greater than 0 to about 5 wt. %, from about 0.1 wt. % to about 4 wt. %, or from about 1 Wt. % to about 3 wt. %, based on the total weight of the composition.

In some embodiments, the compositions disclosed herein optionally comprise an UV stabilizer that may prevent or reduce the degradation of the compositions by UV radiation. Any UV stabilizer known to a person of ordinary skill in the art may be used in the compositions disclosed herein. Non-limiting examples of suitable UV stabilizers include benzophenones, benzotriazoles, aryl esters, oxanilides, acrylic esters, Formamidine carbon black, hindered amines, nickel quenchers, hindered amines, phenolic antioxidants, metallic salts, zinc compounds and combinations thereof. In other embodiments, the amount of the UV stabilizer in the composition can be from about greater than 0 to about 10 wt. %, from about 0.1 wt. % to about 5 wt. %, or from about 1 wt. % to about 2.5 wt. %, based on the total weight of the composition.

In some embodiments, the compositions disclosed herein optionally comprise an extender. Any extender known to a person of ordinary skill in the art may be used in the composition disclosed herein. Some non-limiting examples of suitable extenders include petroleum extracts, e.g., aromatic extracts, distillates or residues, and suitable solvents such as diesel fuel, naphtha and the like.

In some embodiments, the compositions disclosed herein optionally comprise a polymer which is different from the interpolymer. Any polymer that is compatible with bitumen or asphalt may be used as an additive in the composition disclosed herein. Some non-limiting examples of suitable polymer additives include styrene block copolymers (SBC) derived from styrene and conjugated dienes, such as butadiene or isoprene. Some non-limiting examples of suitable styrene block copolymers include styrene-butadiene-styrene (SBS) styrene-isoprene-styrene (STS), and styrene-ethylene-butadiene-styrene block copolymers (SEBS)). In general, these styrene block copolymers have good solubility in bitumen compositions and therefore, the resulting modified-bitumen compositions have good rheological and, or performance properties. SBS is a particularly preferable additive for use in conjunction with the ethylene/alpha-olefin interpolymer, for example, EPDM. When used in this manner, SBS is used in an amount sufficient to faciliate the modification of the bituminous material and enhance the properties, for example, elastic recovery, of the composition. Typically, the weight ratio of SBS to ethylene/alpha-olefin interpolymer is from about 10 to about 90 and preferably from about 20 to about 80.

Additional non-limiting examples of suitable polymer additives include polyethylene or polypropylene homopolymers or copolymers. In some embodiments, the polymer additives are homopolymers and copolymers of propylene (collectively referred to as "PP"). The PP copolymers generally contain a comonomer in an amount of about 1 wt. % to about 20 wt. %. The comonomer can be ethylene, an alpha-olefin of 4 to 16 carbon atoms, or a mixture thereof. Examples of alpha-olefins include ethylene, butene, pentene, hexene, octene, and 4-methyl-1-pentene copolymers. Additionally, the PP can be prepared from polar monomers such as maleic acid esters, acrylic and methacrylic acid esters. The PP can be prepared by conventional Ziegler-Natta or metallocene catalysts. Some suitable PP polymers comprise crystalline, high molecular weight solid products from the polymerization of one or more mono-olefins by either high pressure or low pressure processes. Some non-limiting examples of such polymers include isotactic PP, syndiotactic PP or atactic PP (APP).

In some embodiments, the polymer additives are polyethylenes and their related copolymers such as butene, propylene, hexene, octene, 4-methyl-1-pentene copolymers; functional grades of polyethylenes such as maleic acid esters, acrylic and methacrylic acid esters, acrylonitrile, vinyl acetate, and derivatives such as chlorinated and sulfonated polyethylenes and copolymers; ionomers; polyvinyl chlorides and their related copolymers, functional and modified grades; polymers of acetal and their related copolymers and modified grades; fluorinated olefin polymers; polyvinylidene fluoride; polyvinyl fluoride: polyamides and their modified grades; polyimides; polyarylates; polycarbonates and their related copolymers and modified grades; polyethers; polyethersulfones; polyarylsulphones; polyketones; polyetherimides; poly(4-methyl-1-pentene)-; polyphenylenes and modified grades; polysulphones; polyurethanes and their related modified grades; polyesters and their related modified grades;

polystyrene and their related copolymers and modified grades; polybutylene; polymers of acrylonitrile, polyacrylates, mixtures thereof, and the like.

In some embodiments, the compositions disclosed herein optionally comprise a crosslinking agent. Any crosslinking agent that can couple (chemically or otherwise) the interpolymer or a polymer additive with the bituminous material can be used. In some embodiments, the crosslinking agent includes crosslinking materials or curatives which do not require the addition of a curing or crosslinking activator. In other embodiments, the crosslinking agent includes a crosslinking material or curative which requires the addition of a cure activator or crosslinking activator to the crosslinking material. If a crosslinking agent is used which requires the further addition of a crosslinking or cure activator, either the cure activator or the crosslinking agent, or both, can be encapsulated.

Any crosslinking agent, or combination of crosslinking agents, suitable for the composition disclosed herein may be used. Some non-limiting examples of suitable crosslinking agents include accelerated sulfur systems, peroxide systems alone or with co-agents, phenolic resin curative systems, phenylenebismaleimide, urethane curatives, grafted alkoxysilanes, hydrosilylation curatives, diamine curatives and combinations thereof. A particularly preferable crosslinking method is to employ polyphosphonic acid and a sulfur cure. In some embodiments, the monomeric unit of the diene can further react. In other embodiments, the monomeric unit of the diene reacts with the crosslinking agent.

In some embodiments, the crosslinking agents are the phenolic curatives. A particularly suitable phenolic curative is a phenolic curing resin made by condensation of halogen substituted phenol, $C_{1-10}$ alkyl substituted phenol (preferably substituted in the para position), or non-substituted phenol with an aldehyde (preferably formaldehyde) in an alkaline medium or by condensation of bi-functional phenol dialcohols. Dimethylol phenols substituted with $C_{5-10}$ alkyl in the para-position are more preferred. Halogenated alkyl substituted phenol curing resins prepared by halogenation of alkyl-substituted phenol curing resins also can be used. Phenolic curing systems may comprise methylol phenolic resins with or without activator such as halogen donor and metal compound. Details of this are described in U.S. Pat. Nos. 3,287,440 and 3,709,840, both of which are incorporated herein in their entirety by reference. Non-halogenated phenolic curing resins may be used in conjunction with halogen donors, preferably along with a hydrogen halide scavenger. Sometimes, halogenated phenolic resins containing 2 to 10 weight percent bromine are used in conjunction with a hydrogen halide scavenger such as metal oxides, for example, iron oxide, titanium oxide, magnesium oxide, magnesium silicate, silicon dioxide, and preferably zinc oxide. The presence of metal oxide and halogen donor singly or together promote the crosslinking function of the phenolic resin. The preparation of halogenated phenolic resin and their use in a curative system comprising zinc oxide are described in U.S. Pat. Nos. 2,972,600 and 3,093,613, the disclosure of which is incorporated herein by reference. When using either a halogenated phenolic curing resin or halogen donor activator, it is essential that the total amount of metal halide (present initially or formed in situ) does not exceed two parts by weight per 100 parts by weight of rubber. Preferred phenolic curing resins contain between about 5-15 weight percent methylol groups. A preferred phenolic curative comprises a non-halogenated dimethylol phenolic resin and zinc oxide.

Suitable phenolic resin curatives are commercially available under the trade name SP-1045 (octylphenol/formaldehyde heat reactive resin), SP-1055, and SP-1056 (brominated octylphenol/formaldehyde heat reactive resins) and are available from Schenectady International, Inc. of New York.

In some embodiments, the crosslinking agent is sulfur or sulfur and a vulcanization accelerator. The addition of sulfur to the compositions disclosed herein may produce sulfide and/or polysulfide cross-linking bonds that may improve thermal stability of the compositions. The sulfur donor curative systems suitable in the practice of the invention comprise conventional sulfur donor crosslinking agents. Suitable sulfur donors include alkyl polysulfides, thiuram disulfides, and amine polysulfides. Some non-limiting examples of suitable sulfur donors are 4,4'-dithiomorpholine, dithiodiphosphorodisulfides, diethyldithiophosphate polysulfide, alkyl phenol disulfide, and tetramethylthiuram disulfide. The sulfur-donors may be used with conventional sulfur-vulcanizing accelerators, for example, thiazole accelerators such as benzothiazyl disulfide, N-cyclohexyl-2-benzothiazole-sulfenamide, 2-mercaptobenzothiazole, N-tert-butyl-2-benzothiazole-sulfenamide, 2-benzothiazyl-N,N-diethylthiocarbamyl sulfide, 2-(morpholinodithio)benzothiazole, and N,N-dimorpholinodithiocarbamate. Some accelerators such as dithiocarbamates, thiurams and thioureas can be included in these sulfur cures which also include zinc oxide.

Some non-limiting examples of vulcanizing activators include halogen donors and metal halide activators such as stannous chloride (anhydrous or hydrated), ferric chloride, zinc chloride, or halogen donating polymers such as chlorinated paraffin, chlorinated polyethylene, chlorosulfonated polyethylene, and polychlorobutadiene. The term "eactivator", as used herein, means any material which materially increases the crosslinking efficiency of the vulcanizing agent or curative and includes metal oxides and halogen donors used alone or conjointly.

The skilled artisan will be able to readily determine a sufficient or effective amount of crosslinking agent and if necessary, vulcanizing activator to be employed without undue calculation or experimentation. The amount of vulcanizing agent should be sufficient to at least partially vulcanize the elastomeric polymer. In general, the amount of crosslinking agent comprises from about 1 to about 20 parts by weight, from about 3 to about 16 parts by weight, or from about 4 to about 12 parts by weight, crosslinking agent per hundred parts by weight rubber (phr).

In some embodiments, the compositions disclosed herein optionally comprise a lubricant. Some non-limiting examples of lubricants include fatty acids, fatty alcohols, esters, fatty amides, metallic stearates, paraffinic and microcrystalline waxes, silicones and orthophosphoric acid esters.

In some embodiments, the compositions disclosed herein optionally comprise a plasticizer. Some non-limiting examples of plasticizers include esters of dibasic acids (or their anhydrides) with monohydric alcohols such as o-phthalates, adipates and benzoates; heat stabilizers such as organotin mercaptides, an octyl ester of thioglycolic acid and a barium or cadmium carboxylate.

In some embodiments, the compositions disclosed herein optionally comprise a IV stabilizer. Some non-limiting examples of UV stabilizers include a hindered amine, an o-hydroxy-phenylbenzotriazole, a 2-hydroxy-4-alkoxybenzophenone, a salicylate, a cyanoacrylate, a nickel chelate, a benzylidene malonate and oxalanilide.

The composition disclosed herein can be prepared by a variety of processes. In some embodiments, the composition is prepared by introducing the interpolymer, the bituminous material and optionally an additive into a mixing device, and mixing the ingredients until uniformly mixed. If desired, a concentrated composition can be prepared at this time or some later time. Such a concentrated form may faciliate transportation and/or storage and will typically be capable of being diluted, e.g. "let down" at an appropriate time. In other embodiments, the interpolymer is not substantially degraded during the mixing or any "let down" process. In some embodiments, the composition may be stored at a temperature greater than 100° C., preferably greater than 120° C., more preferably greater than 140° C., for greater than one hour, without a substantial increase in gel formation. This can be observed by for example, RTFO testing.

In some embodiments, the composition is prepared by dissolving an interpolymer comprising ethylene, at least one alpha-olefin, and, optionally, at least one diene in a bituminous material, and wherein the interpolymer is derived from polymer particles that have a surface coating comprising a partitioning agent. In some embodiments, the composition is prepared by dissolving an interpolymer comprising ethylene, at least one alpha-olefin, and, at least one diene in a bituminous material, and wherein one or more of the unreacted double bonds in the interpolymer further chemically modified in situ in the process to produce the article. In some embodiments, the process comprises storing the interpolymer disclosed herein at a temperature of greater than 100° C., preferably greater than 120° C., more preferably greater than 140° C. for longer than about 1 hour without the loss in performance relative to the un-stored polymer containing mixture.

The mixing device can be any mixing device preferably a high shear device, capable of heating and mixing the interpolymer with the bituminous material and optional additives until a uniform mixture is obtained. During preparation of the composition, one or more additives can be mixed with the interpolymer and the bituminous material. The additives can be added in the melt or liquid state. If the additives are in liquid form at room temperature then melting is not required.

Some non-limiting examples of suitable mixing devices include high shear mills, concrete mixers, asphalt mixers, BANBURY™ mixers, BRABENDER™ mixers and certain mixing extruders such as co-rotating, counter-rotating, single screw and twin-screw extruders, ring extruders, and planetary extruders, as well as co-kneaders. In some embodiments, single and twin extruders, optionally containing vent port(s) to remove volatiles, are used to prepare the composition.

The compositions disclosed herein can be prepared by a process comprising mixing or dissolving the bitumen material with the polymer and optionally an additive. The process can be carried out at any suitable temperatures, pressures, and times. Such temperatures, pressures, ingredients, amounts of ingredients, and times may vary depending upon, for example, the materials employed, the equipment available, and the desired application. For example, roofing applications typically employ a higher temperature application than paving applications. Therefore, the compositions of the present invention are particularly suited for roofing applications since the compositions are typically stable at high temperatures. Similarly, if high UV stability is desired, then one may want to employ, for example, more polymer particles. The higher the temperature employed, the faster the mixing will be, though a longer cooling time may be required. The process can be carried out at a temperature in the range of from about 50° C. to about 300° C., from about 60° C. to about 275° C., from about 75° C. to about 200° C., from about 100° C. to about 250° C., from about 100° C. to about 140° C. The process may be carried out at ambient pressure or elevated pressure. In some embodiments, the process is carried out at ambient pressure. The process can be carried out over a time period of less than about 24 hours, less than about 12 hours, less than about 6 hours, less than about 4 hours, less than about 3 hours, less than about 2 hours or less than about 1 hour.

The composition disclosed herein can be used to form a weatherproof barrier to protect a structure against, for example, water or ice. Such barriers may take the form of, for example, flashing, vapor barriers, below ground barriers, roof underlays, as well as ice protection barriers. In some embodiments, the composition disclosed herein can be used to make various articles such as asphalt shingles. Asphalt shingles can come in two basic types, i.e., glass fiber and organic. Organic shingles primarily consist of paper or an organic felt material which is generally paper saturated with an asphalt composition, such as the compositions disclosed herein, to make it waterproof. A coating of a composition disclosed herein may be applied on top of the shingles and ceramic granules may be embedded in the composition. Organic shingles may contain about 40% more asphalt per unit area than their glass fiber counterpart which makes them weigh more and gives them excellent durability and blow-off resistance.

In general, glass fiber shingles have a glass fiber reinforcing mat manufactured to the shape of the shingle. The glass fiber mat can be coated with the composition disclosed herein to make it waterproof. The glass fiber mat is mainly for reinforcement. In some embodiments, a aggregate may be used in the composition disclosed herein to promote the adhesion between the composition and the mat.

Roof shingles are a roof covering consisting of individual overlapping elements. These elements are normally flat rectangular shapes that are laid in rows without the side edges overlapping, a double layer is used to ensure a waterproof result. Shingles are laid from the bottom edge of the roof up, with the bottom edge of each row overlapping the previous row by about half its length. At the roof ridge there was a cap consisting of copper or lead sheeting which has been substituted by shingles with a PVC underlay.

Shingles have been made of various materials such as wood shingle, slate shingle, asbestos-cement, bitumen-soaked paper covered with aggregate (asphalt shingle) or ceramic. Due to increased fire hazard, wood shingles and paper-based asphalt shingles have become less common than fiberglass-based asphalt shingles. In the United States, fiberglass-based asphalt shingles are by far the most common roofing material used for residential roofing applications. Two types of asphalt shingles are used: organic and fiberglass or glass fiber. Organic shingles are generally paper (felt) saturated with asphalt to make it waterproof, then a top coating of adhesive asphalt is applied and the ceramic granules are then embedded. A portion of the granules contain leachable copper or more often tin to prevent moss growth on the roof. Organic shingles contain around 40% more asphalt per square (100 sq. ft.) than fiberglass shingles, which makes them weigh more and gives them excellent durability and blow-off resistance. Shingles are judged by weight per square.

Fiberglass shingles have a glass fiber reinforcing mat manufactured to the shape of the shingle. The mat is then coated with asphalt which contains mineral aggregates. The glass fiber mat is not waterproof by itself and is a wet laid fiberglass mat bonded with urea-formaldehyde resin. It's used for reinforcement. The asphalt makes the fiberglass shingle waterproof. Fiber-lass reinforcement was devised as the replacement for asbestos paper reinforcement of roofing shingles and typically ranges from 1.8 to 2.3 pounds/square. The older asbestos versions were actually more durable and were harder to tear, an important property when considering wind lift of shingles in heavy storms. Fiberglass is slowly replacing felt reinforcement in Canada and has replaced mostly all felt reinforcement in the United States. Widespread hurricane damage in Florida during the 1990's prompted the industry to adhere to a 1700-ram tear value on finished asphalt shingles.

Shingles are ranked by warranted life, ranging from 25 to 50 years. A newer design of asphalt shingle, called laminated, uses two distinct layers and is heavier, more expensive and more durable than traditional designs. Laminated shingles also give a more 3-D effect to a roof surface.

In some embodiments, the composition disclosed herein can be used to make modified bitumen (MB). MB is generally an asphalt that comprises one or more additives or modifiers which give MB plastic or rubber-like properties. The most common types of MB modifiers are APP and SBS.

Waterproof sheets or membranes can be prepared from the modified bitumen derived from the composition disclosed herein. The waterproof sheets or membranes may consist of one, two, or three ply systems. In some embodiments, the waterproof sheets or membranes comprise a layer which comprises the composition disclosed herein. In other embodiments, the waterproof sheets or membranes further comprise a second layer and a support. In further embodiments, the support comprises paper, felt, glass fibers or a combination thereof. In further embodiments, the waterproof sheets or membranes further comprise an inorganic aggregate such as mineral granules, aluminum, copper, an aggregate such as gravel or slag, or a combination thereof.

Modified membranes can also be installed in conjunction with built-up roof materials (such as multiple plies of fiberglass felt) to form a hybrid roof system. Modified bitumen roof systems can be used in residential, commercial and industrial applications.

In some embodiments, roofing grade asphalts can be prepared by air-blowing the composition disclosed herein at elevated temperatures. Alternatively, roofing grade asphalts can be prepared by mixing the composition disclosed herein with atactic polypropylene which gives the composition some plastic properties. In some embodiments there are about 30% of APP modifier in the composition disclosed herein.

In some embodiments, the modified bitumen sheets or membranes comprise at least one reinforcement material. In some embodiments, the reinforcement material is a polyester mat. The reinforcement material can be dipped into a hot modified bitumen mix comprising the composition disclosed herein. Subsequently, the modified bitumen sheets or membranes goes through a rolling cylinder, cooled, and then wound into a roll.

The APP modified bitumen sheets or membranes can be applied using a torch. The back of the sheets or membranes may have extra asphalt on it which, when heated, bonds to the substrate. This can be convenient for the smaller, more cut up roofs because less room and equipment is needed on site to torch-apply a membrane than is necessary for application using hot bitumen.

SBS modified bitumen can be prepared by adding from about 10% to about 15% of SBS rubber to the composition disclosed herein. There are a wide range of reinforcements used in SBS roofing materials. These include fiberglass or polyester mats and scrims, or combinations of both. The type of reinforcement used generally depends on the material's performance requirements.

The composition disclosed herein can be used to prepare various paving materials such as asphalt concrete, mastic asphalt or stone mastic asphalt, for paving applications. Asphalt concrete generally comprises a bituminous binder, limestone aggregate, and sand matrix. Mastic asphalt which can also be used for paving roads, differs from asphalt concrete in that the former has a higher bitumen content that the latter. The paving materials can be used to pave roads, rail beds, runways, running tracks, greenway trails, playgrounds, bicycle and golf cart paths, racetracks, basketball and tennis courts, driveways, subdivision roads, animal feed lots, poultry house floors, barn floors, greenhouse floors, work sites, log yards, ports, freight yards, landfill caps and the like.

In some embodiments, the process of paving a road comprises heating the composition disclosed herein, and applying the heated composition to a road surface. In further embodiments, the composition further comprises an inorganic aggregate selected from clays, sands, pebbles, stones, granules, talc, kaolin, dolomite, calcium carbonate, calcium sulfate, silica, aluminum silicate, alumina, hydrated alumina, mica, wollastonite, feldspar, ceramic, glass, barite and combinations thereof. In further embodiments, the interpolymer is not substantially degraded during heating.

In sum the present invention provides stable blends which when using for pavement or roofing applications may have improved temperature stability, aging, and less phase separation.

The following examples demonstrate the practice of the present invention. The examples should not, however, be viewed as limiting the scope of the invention.

EXAMPLES

Examples 1-2

Comparative Example A and Examples 1-2 were prepared and tested to show the efficacy of the compositions disclosed herein in asphalt applications. Citgo PG 64-22 was used as the asphalt base in these asphalt formulations. Each of Comparative Example A and Examples 1-2 was prepared by blending its ingredients in the proportion as shown in Table 1 below. The blending process consisted of 3 hours of high shear mixing and 1 hour of paddle-type agitation, both at 375-390° F. Observations were made during the blending process at predetermined intervals and are summarized in Table 2 below.

TABLE 1

Formulations of Comparative Example A and Examples 1-2.

|  | Comparative Example A | Example 1 | Example 2 |
|---|---|---|---|
| CITGO PG 64-22 | 96.5 | 96.5 | 96.5 |
| KRATON ® D 1102 | 3.5 | | |
| Polymer 1 | | 3.5 | |
| Polymer 2 | | | 3.5 |

Note:
Kraton D 1102 is a SBS-type of polymer available from Kraton Polymers LLC;
PG 64-22 is an asphalt obtained from Citgo; and
Polymer 1 is prepared according to U.S. 2005/0140049 and has 68.5 weight percent ethylene, 4.5 weight percent ethylene norbornene and 28 parts per hundred carbon black NG50 type partitioning agent, and a polymer Mooney viscosity of 85 at 125° C.
Polymer 2 is prepared according to U.S. 2005/0140049 and has 68 weight percent ethylene, 2.2 weight percent ethylene norbornene and 28 parts per hundred carbon black NG50 type partitioning agent, and a polymer Mooney viscosity of 60 at 125° C.

TABLE 2

Mixing And Blending Observations.

| Process Time | Comparative Example A | Example 1 | Example 2 |
|---|---|---|---|
| 15 minutes | smooth | gritty, sticky | gritty texture |
| 30 minutes | smooth | some grittiness | gritty texture |
| 45 minutes | smooth and | smooth | even dispersion |
| 1 hour | homogenous | smooth, homogenous, | smooth, and |
| 2 hours | | and sticky | homogenous |
| 3 hours | | | |
| 4 hours | | | |

Upon the completion of the blending process, the softening point and dynamic shear rheometery (DSR) properties of Comparative Example A and Examples 1-2 were measured and the results are shown in Table 3 below.

TABLE 3

The softening point and DSR Properties of Comparative Example A and Examples 1-2 after blending.

| Properties | | | Comparative. Example A | Example 1 | Example 2 |
|---|---|---|---|---|---|
| Softening Point, ° F. (° C.) | | | 131.7 (55.4) | 135.4 (57.4) | 134.3 (56.8) |
| Dynamic Shear | kPa; (G*/Sin δ) | 76° C. | 0.9144 | 1.257 | 1.218 |
| Rheometer (DSR) | Phase Angle, ° | | 85.28 | 82.09 | 85.91 |

Comparative Example A and Examples 1-2 were reheated and re-mixed and then tested for their flash points, DSR properties, and softening points. The testing methods and results are shown in Table 4 below AASHTO T 48, AASHTO T 315, AASHTO T 316, ASTM D 6084 are incorporated herein by reference.

TABLE 4

| Properties | | Testing method | Comp. Ex. A | Ex. 1 | Ex. 2 |
|---|---|---|---|---|---|
| Flash Point, COC, ° F. (° C.) | | AASHTO T 48 | 555 (291) | 554 (291) | 562 (294) |
| DSR, G*/Sin δ, kPa | 70° C. | AASHTO T 315 | 1.693 | 2.334 | 2.174 |
| | 76° C. | | 0.8664 | 1.198 | 1.040 |
| | 82° C. | | — | 0.6995 | 0.552 |
| | Fail Temp, ° C. | | 74.72 | 77.91 | 76.65 |
| Viscosity, Pa · s | 135° C. | AASHTO T 316 | 0.925 | 1.025 | 0.945 |
| | 165° C. | | 0.260 | 0.285 | 0.254 |

Rolling Thin Film Oven Test (RTFOT)

The RTFOT was carried out to test the ability of Comparative Example A and Examples 1-2 in withstanding different temperature conditions. The details of the RTFOT test may be found in "Background of Superpave Asphalt Binder Test Methods", Publication Number fhwa-sa-94-069 available from, for example, FHWA Reports Distribution Center and incorporated herein by reference. After the RTFOT, the samples were tested for mass loss, DSR properties and elastic recovery. The testing methods and results are shown in Table 5 below. AASHTO T 240. AASHTO T 315, ASTM D 6084 are incorporated herein by reference.

TABLE 5

| Properties | | Testing Method | Comp. Ex. A | Ex. 1 | Ex. 2 |
|---|---|---|---|---|---|
| Mass Loss, % | | AASHTO T 240 | 0.0728 | 0.0756 | 0.0916 |
| DSR, G*/Sin *, kPa | 70° C. | AASHTO T 315 | 3.679 | 5.339 | 5.197 |
| | 76° C. | | 1.837 | 2.681 | 2.492 |
| | 82° C. | | 0.9322 | 1.384 | 1.270 |
| | Fail Temp, ° C. | | 74.47 | 77.84 | 77.23 |
| Elastic Recovery, % | 25° C. | ASTM D 6084 | 45.3 | 45.0 | 39.0 |

The results show that Examples 1 and 2 aged very well as the eleastic recovery was not substantially changed after RTFOT as Example 1 was 45 before RTFOT and Example 2 was 41.5 before RTFOT.

Pressure Aging Vessel (PAV) Test

The PAV test was carried out to assess the performance of Comparative Example A and Examples 1-2 after aging according to AASHTO R 28, which is incorporated herein by reference. The aging process consisted of maintaining the samples under 100° C. and 300 psi for 20 hours. The PAV parameters were established to correlate to 6-8 years of actual service life. The PAV residues were tested for DSR, creep stiffness, and performance grades The testing methods and results are shown in Table 6 below AASHTO T 315, AASHTO T 313, AASHTO M 320 are incorporated herein by reference.

TABLE 6

| Properties PAV Residue ((100 ° C.: 300 psi; 20 hrs) | | Testing Method AASHTO R 28 | Comp. Ex. A | Ex. 1 | Ex. 2 |
|---|---|---|---|---|---|
| DSR, G, Sin δ, kPa | 25 | AASHTO T 315 | 2,837 | 4.186 | 3,382 |
| | 22° C. | | 4,175 | 6,086 | 4,898 |
| | 19° C. | | 5,971 | — | 6,925 |
| | Fail Temp, ° C. | | 20.4 | 23.6 | 21.8 |
| Creep Stiffness | Stiffness, MPa | −12° C. | AASHTO T 313 | 183 | 259 | 245 |
| | m Value | | | 0.348 | 0.329 | 0.331 |
| | Stiffness, MPa | −18° C. | | 376 | 550 | 522 |
| | m Value | | | 0.285 | 0.256 | 0.260 |
| | Fail Temperature, ° C. | | | −16.2 | −13.2 | −13.6 |
| SUPERPAVE ™ Performance Grade, PG | | AASHTO M 320, Table 1 | 70-22 | 76-22 | 76-22 |
| "True" Performance Grade | | | 74.5-16.2 | 77.8-13.2 | 76.6-13.6 |
| Temperature Performance Range, ° C. | | | 90.7 | 92.0 | 91.2 |

Base Asphalts

The composition disclosed herein can also be blended with base asphalts AAM-1, ABL-1, ABL-2, ABM-1, AAM-1 is prepared from 100% W. TX Intermediate and graded as an AC-20/PG 64-16. It is generally considered as a poor quality asphalt exhibiting poor low temperature properties with extreme difficulty in modification. ABL-1 is prepared from 100% Boscan crude from Venezuela and graded as an AC-20/PG 64-XX. It is widely used in the Eastern and Gulf Coast states and it is generally difficult to be modified. ABL-2 is soft and graded as an AC-10/PG 58-XX. It can be modified chemically with permeable porous asphalt (PPA) to a PG 64-XX/AC-20. ABM-1 is prepared from 100% California Valley crude and graded as an AR-4000 (AC-20/PG 58-XX). It is an industry standard for modification with SBS and is generally considered as a compatible asphalt. The properties of AAM-1, ABL-1, ABL-2, ABM-1 are listed in Table 7 below.

TABLE 7

| Properties | | AAM-1 | ABL-1 | ABL-2 | ABM-1 |
|---|---|---|---|---|---|
| Viscosity, Poise | 140° F. | 1992 | 2201 | 1097 | 2230 |
| Viscosity, cSt | 275° F. | 569 | 441 | 338 | 243 |
| Penetration, 100 g, 5 sec. | 77° F. | 64 | 87 | 169 | 48 |
| Ductility, cm | 39.2° F. | 4 | 9 | 12 | 0 |
| | | 4.6 | 54 | 150 | 0 |
| Softening Point, ° F. (R&B) | | 125 | 117 | 106 | 120 |

Permeable Porous Asphalt

To determine the proper dosage of permeable porous asphalt (PPA) in ABL-2, experiments were conducted by mixing ABL-2 with different amounts of 15% PPA as shown in Table 8 below. Upon the completion of the blending process, the absolute viscosity, DSR properties, penetration, and softening point of the various mixtures G-K were measured according to the procedures disclosed above. The results are shown in Table 8 below.

TABLE 8

| Test | | 0.0 wt. % of 15% PPA | 1.0 wt. % of 15% PPA | 0.2 wt. % of 15% PPA | 0.39 wt. % of 15% PPA | 0.3 wt. % of 15% PPA |
|---|---|---|---|---|---|---|
| Absolute Viscosity, P | 60° C. | 1210 | | | | 2004 |
| DSR, kPa (G*/sinδ) | 64° C. | 0.684 | 3.56 | 0.913 | 1.10 | 1.10 |
| | 70° C. | 0.359 | 1.92 | 0.475 | 0.52 | 0.52 |
| Penetration, dmm | 77° F. | 147 | Not required | | | 116 |
| Softening Point, ° F. (° C.) | | 108.5 | | | | 114 |

Examples 3-6

Examples 3-6 were prepared by blending 3.5 weight percent of Polymer 1 with 96.5 weight percent of AAM-1, ABL-1, ABL-2, ABM-1 respectively as shown in Table 9 below.

TABLE 9

| Ingredients | | Ex. 3 | Ex. 4 | Ex. 5 | Ex. 6 |
|---|---|---|---|---|---|
| Base Asphalts | AAM-1 | 96.5 | | | |
| | ABM-1 | | 96.5 | | |
| | ABL-1 | | | 96.5 | |
| | ABL-2 + PPA | | | | 96.5 |
| Polymer 1 | | 3.5 | 3.5 | 3.5 | 3.5 |

After the blending process was complete, the softening points and dynamic shear rheometry (DSR) properties of Examples 3-6 were measured. The results are shown in Table 10 below.

TABLE 10

| Properties | | Ex. 3 | Ex. 4 | Ex. 5 | Ex. 6 |
|---|---|---|---|---|---|
| Softening Point, ° F. | | 141.5 | 143 | 143 | 138 |
| DSR, kPa (G*/sinδ) | 70° C. | 2.21 | 2.25 | 2.46 | 2.06 |
| | | 81.8 | 84.9 | 80.2 | 76.7 |

Examples 3-6 were subjected to the RTFOT and the PAV Test. Before the RTFOT and PAV tests, Examples 3-6 were measured or tested for their flash points, DSR properties, and viscosity. The results are shown in Table 11 below.

TABLE 11

| Properties | | Ex. 3 | Ex. 4 | Ex. 5 | Ex. 6 |
|---|---|---|---|---|---|
| Flash Point, COC, ° F. (° C.) | | 660 (349) | 495 (257) | 520 (271) | 550 (287) |
| DSR, G*/sinδ, | 70° C. | 2.20 | 2.26 | 2.51 | 2.18 |
| kPa | 76° C. | 1.12 | 1.02 | 1.27 | 1.16 |
| | 82° C. | 0.609 | 0.494 | 0.678 | 0.645 |
| Viscosity, cps | 135° C. | 1533 | 742 | 1328 | 1430 |
| | 165° C. | 456 | 187 | 335 | 361 |
| Elastic Recovery, % | 25° C. | 53 | 42 | 44 | 54 |

The Rolling Thin Film Oven Test (RTFOT)

The RTFOT was carried out to test the ability of Examples 3-6 in withstanding different temperature conditions. After the RTFOT, the samples were tested for mass loss. DSR properties and elastic recovery according to the procedures disclosed above. The testing methods and results are shown in Table 11 below.

TABLE 11

| Properties | | Ex. 3 | Ex. 4 | Ex. 5 | Ex. 6 |
|---|---|---|---|---|---|
| Mass Change, % | | +0.127 | −0.208 | −0.392 | −1.48 |
| DSR, G*/sinδ, kPa | 70° C. | | 3.43/3.20/3.17 | | |
| | 76° C. | 2.43 | 1.49/1.43/1.49 | 3.18 | 3.75 |
| | 82° C. | 1.25 | — | 1.67 | 2.07 |
| Elastic Recovery, % | 25° C. | 52 | 40 | 50 | 53 |

The Pressure Aging Vessel (PAV) Test

The PAV test was carried out to assess the performance of Examples 3-6 after aging at 100° C. and 300 psi for 20 hrs. The PAV residues were tested for DSR, creep stiffness, and performance grades according to the procedures disclosed above. The testing methods and results are shown in Table 12 below.

TABLE 12

| Properties | | Ex. 3 | Ex. 4 | Ex. 5 | Ex. 6 |
|---|---|---|---|---|---|
| DSR, G* · sinδ, kPa | 22° C. | 3840 | 3320 | 4400 | — |
| | 19° C. | 5210 | 5630 | 6240 | 4610 |
| | 16° C. | — | — | — | 6490 |
| Creep Stiffness | Stiffness, MPa | −06° C. | 79 | 170 | — | — |
| | m Value | | 0.321 | 0.398 | — | — |
| | Stiffness, MPa | −12° C. | 172 | 453 | 148 | 198 |
| | m Value | | 0.283 | 0.311 | 0.351 | 0.313 |
| | Stiffness, MPa | −18° C. | — | — | 250 | 388 |
| | m Value | | — | — | 0.275 | 0.256 |
| Performance Grade, PG | | 76-16 | 76-16 | 76-22 | 76-22 |
| "True" Performance Grade, PG | | 76-16 | 76-18 | 78-25 | 77-23 |
| Effective Temperature Range, ° C. | | 93 | 100 | 94 | 103 |

Examples 7-10

Examples 7-10 were prepared by blending ABL-1, Polymer 1 and VESTENAMER (a semicrsytalline rubber of polyoctenamer available from Degussa) according to the proportions listed in Table 13 below. The blending process consisted of steps as described above.

TABLE 13

| Ingredients | Ex. 7 | Ex. 8 | Ex. 9 | Ex. 10 |
|---|---|---|---|---|
| ABL-1 | 96.2 | 95.9 | 84.4 | 76.5 |
| Polymer 1 | 3.5 | 3.5 | 15.0 | 23.2 |
| VESTENAMER | 0.3 | 0.6 | 0.3 | 0.3 |

Observations were made during the blending process at predetermined intervals and are summarized in Table 14 below.

TABLE 14

| Time | Ex. 7 | Ex. 8 | Ex. 9 | Ex. 10 |
|---|---|---|---|---|
| 2 hours | Polymer dispersed, smooth, smoke | Polymer dispersed, smooth | Sample somewhat difficult to disperse. Smooth after 4 hours (typical of SBS) | Polymer dispersed, smooth |
| 3 hours | | Polymer dispersed, smooth | | |
| 4 hours | | | | |

Upon the completion of the blending process, the softening point and Dynamic Shear Rheometry properties of the examples were measured and the results are listed in Table 15 below.

TABLE 15

| Properties | | Ex. 7 | Ex. 8 | Ex. 9 | Ex. 10 |
|---|---|---|---|---|---|
| Softening Point, ° F. | | 141.5 | 139 | 211.5 | 135 |
| DSR, G*/sinδ, kPa | 70° C. | 1.73 | 1.60 | 23.4 | 1.15 |
| Phase Angle, ° | | 80.9 | 81.1 | 60.4 | 82.7 |

Examples 7-10 were heat-treated at 163° C. for 48 hours for compatibility/separation assessment. After the heat-treatment, the softening points and dynamic shear rheometry (DSR) properties of Examples 7-10 were measured again. The results are shown in Table 16 below.

TABLE 16

| Properties | | Ex. 7 | Ex. 8 | Ex. 9 | Ex. 10 |
|---|---|---|---|---|---|
| Softening Point, Top 1/3, ° F. (° C.) | | 150.4 (65.7) | 150.25 (65.7) | Not tested | 143.25 (61.8) |
| DSR, Top 1/3, G*/sinδ, kPa | 70° C. | 6.3 | 4.58 | | — |
| | 76° C. | 3.28 | 2.43 | | 1.58 |

TABLE 16-continued

| Properties | | Ex. 7 | Ex. 8 | Ex. 9 | Ex. 10 |
|---|---|---|---|---|---|
| Softening Point, Bottom 1/3, °F. (°C.) | | 135 (57.2) | 136 (57.8) | | 135 (57.2) |
| DSR, Bottom 1/3, G*/sinδ, kPa | 70° C. | 3.23 | 2.83 | | — |
| | 76° C. | 1.61 | 1.35 | | 1.06 |
| SP Difference, °F. (°C.) | | 15.4 (8.5) | 14.25 (7.9) | | 8.25 (4.6) |
| DSR Difference, kPa | 70° C. | 3.07 | 1.75 | | — |
| | 76° C. | 1.67 | 1.08 | | 0.52 |

Examples 7-10 were subjected to the RTFOT and PAV tests. Before the RTFOT and PAV tests, Examples 7-10 were measured for their flash points, DSR properties, elastic recovery properties, and softening points. The results are shown in Table 17 below.

TABLE 17

| Properties | | Ex. 7 | Ex. 8 | Ex. 9 | Ex. 10 |
|---|---|---|---|---|---|
| Flash Point, COC, °C. | | N/A | N/A | Not tested | 316 |
| DSR, G*/sinδ, kPa | 70° C. | 3.56 | 3.29 | | 2.11 |
| | 76° C. | 1.8 | 1.62 | | 1.08 |
| | 82° C. | 0.945 | 0.864 | | 0.581 |
| Viscosity, cps | 135° C. | 1605 | 1535 | | 1154 |
| | 165° C. | 396 | 392 | | 304 |
| Elastic Recovery, % | 25° C. | 44 | 44 | | 44.5 |

The Rolling Thin Film Oven Test (RTFOT)

The RTFOT was carried out to test the ability of Examples 7-10 in withstanding different temperature conditions. After the RTFOT, the samples were tested for mass loss, DSR properties and elastic recovery according to the procedures disclosed above. The testing methods and results are shown in Table 18 below.

TABLE 18

| Properties | | Ex. 7 | Ex. 8 | Ex. 9 | Ex. 10 |
|---|---|---|---|---|---|
| Mass Change, % | | −0.253 | −0.494 | Not tested | −0.428 |
| DSR, G*/sinδ, kPa | 70° C. | 8.05 | 7.54 | | 5.53 |
| | 76° C. | 4.13 | 3.86 | | 2.80 |
| | 82° C. | 2.16 | 2.02 | | 1.45 |
| Elastic Recovery, % | 25° C. | 46 | 51.5 | | 48.5 |

The Pressure Aging Vessel (PAV) Test

The PAV test was carried out to assess the performance of Examples 7-10 after aged at 100° C. and 300 psi for 20 hrs. The PAV residues were tested for DSR, creep stiffness, and performance grades according to the procedures disclosed above. The testing methods and results are shown in Table 19 below.

TABLE 19

| Properties | | | Ex. 7 | Ex. 8 | Ex. 9 | Ex. 10 |
|---|---|---|---|---|---|---|
| DSR, G*/sinδ, kPa | | 28° C. | 2860 | 2500 | Not tested | |
| | | 25° C. | 4100 | 3610 | | |
| | | 22° C. | 5790 | 5120 | | 4550 |
| | | 19° C. | — | — | | 6430 |
| Creep Stiffness | Stiffness, MPa | −06° C. | — | — | | |
| | m Value | | | | | |
| | Stiffness, MPa | −12 ° C. | 162 | 148 | | 150 |
| | m Value | | 0.325 | 0.339 | | 0.354 |
| | Stiffness, MPa | −18° C. | 315 | 298 | | 288 |
| | m Value | | 0.281 | 0.285 | | 0.302 |
| | Stiffness, MPa | −24° C. | — | — | | 557 |
| | m Value | | — | — | | 0.250 |
| Performance Grade, PG | | | 76-22 | 76-22 | N/A | 76-28 |
| "True" Performance Grade, PG | | | 81-25 | 80-22 | N/A | 76-28 |
| Effective Temperature Range, °C. | | | 106 | 102 | N/A | 104 |

Examples 11-13

Comparative Example B and Examples 11-13 were prepared by blending the ingredients in the proportions as shown in Table 20 below. Citgo's PG 76-22 was used as the base asphalt. The blending process consisted of 1 hour of high shear mixing and 3 hours of paddle-type agitation at 375-390° F. to make the binders homogenous and smooth. Examples 11-13 were smooth and homogenous after approximately 3 hours of processing.

TABLE 20

| INGREDIENTS | | Comp. Ex. B | Ex. 11 | Ex. 12 | Ex. 13 |
|---|---|---|---|---|---|
| Citgo PG 70-22 | | 100.0 | 97.5 | 97.5 | 97.5 |
| | Citgo ICL | | 2.5 | 1.5 | 1.5 |
| Polymers | Polymer 1 | | | 1.0 | |
| | Polymer 2 | | | | 1.0 |

Note:
Citgo PG 70-22 is an asphalt and Citgo ICL is a polymer obtained from Citgo; and Polymer 1 and Polymer 2 are interpolymers prepared according to U.S. 2005/0140049.

The original properties, and properties after the RTFOT and PAV tests were measured for Comparative Example B and Examples 11-13. The test methods and results are listed in Table 21.

TABLE 21

| | | | | Comp. Ex. B | Ex. 11 | Ex. 12 | Ex. 13 |
|---|---|---|---|---|---|---|---|
| ORIGINAL PROPERTIES | | | | | | | |
| Flash Point, ° F. | | | ASTM D 92 | 565 | 545 | 525 | 545 |
| DSR | G*/Sin δ, kPa | 70° C. | | | 1.656 | 3.449 | — |
| | Phase Angle, ° | | | | 85.1 | 76.4 | — |
| | G*/Sin δ, kPa | 76° C. | | 0.785² | 1.783 | 1.570 | 2.623 |
| | Phase Angle, ° | | AASHTO T 315 | 86.2 | 78.8 | 83.0 | 77.7 |
| | G*/Sin δ, kPa | 82° C. | | — | 0.954 | 0.805 | 1.379 |
| | Phase Angle, ° | | | — | 81.3 | 84.9 | 80.1 |
| | G*/Sin δ, kPa | 88° C. | | — | — | — | 0.769 |
| | Phase Angle, ° | | | — | — | — | 82.1 |
| Rotational Viscosity, cps | | 135° C. | AASHTO T 316 | 725 | 1.460 | 1.375 | 2.056 |
| | | 165° C. | | 182 | 340 | 324 | 400 |
| Softening Point, ° F. | | | ASTM D 36-06 | 131 | 142 | 143 | 150 |
| Elastic Recovery, % | | 25° C. | ASTM D 6084 | 21.0 | 60.0 | 50.0 | 61.0 |
| Separation, ° F. Difference | | 163° C. | ASTM D 5084 | +1.0 | +1.1 | +10.0 | +2.0 |
| PROPERTIES AFTER RTFOT | | | | | | | |
| Mass Loss, % | | | AASHTO T 240 | 0.087 | 0.089 | 0.041 | 0.043 |
| | | 70° C. | | | 3.674 | 6.660 | — | — |
| DSR | G*/Sin δ, kPa | 76° C. | AASHTO T 315 | 1.734 | 3.418 | 3.61 | 5.36 |
| | | 82° C. | | — | 1.812 | 1.82 | 2.76 |
| | | 88° C. | | — | — | — | 1.44 |
| Elastic Recovery, % | | | ASTM D 6084 | 69 | 41 | 59 | 60 |
| | | 25° C. | AASHTO T 301 | 65 | 29 | 47 | 48 |
| MSCR, % | @100 Pa | | AASHTO | 22 | 4 | 11 | 25 |
| | @ 3200 Pa | | Pending | 5 | 1 | 0 | 9 |
| PROPERTIES OF PAV RESIDUE (100° C., 20 hrs, 300 psi) | | | | | | | |
| DSR | G* · Sin δ, kPa | 25° C. | AASHTO R 28 | 5,312 | 5,458 | 6,590 | 5,610 |
| | | 28° C. | AASHTO T 315 | 3,595 | 3,877 | 4,650 | 3,860 |
| | | 31° C. | | — | 2,608 | 3,230 | — |
| | | 34° C. | | — | — | — | 1,750 |
| Creep Stiffness | Stiffness, MPa | −12° C. | AASHTO T 313 | 255 | 244 | 268 | 274 |
| | m Value | | | 0.339 | 0.314 | 0.306 | 0.317 |
| | Stiffness, Mpa | −18° C. | | 537 | 472 | 476 | 490 |
| | M Value | | | 0.265 | 0.246 | 0.231 | 0.242 |
| PERFORMANCE GRADING: | | | | | | | |
| Performance Grade, PG | | | AASHTO M 320 | 70-22 | 76-22 | 76-22 | 82-22 |
| "True" Performance Grade, PG | | | | 74.1-23.3 | 80.2-23.1 | 80.2-23.2 | 84-22.9 |
| Effective Temperature Range, ° C. | | | Table 1 Calculation | 92/97.4 | 98/103.3 | 98/103.2 | 104/106.9 |

Examples 14-16

Comparative Examples C-D and Examples 14-16 were prepared by blending the ingredients in the proportions as shown in Table 22 below. Citgo's PG 76-22 was used as the base asphalt. The blending process consisted of 1 hour of high shear mixing and 3 hours of paddle-type agitation at 375-390° F. to make the binders homogenous and smooth.

TABLE 22

| INGREDIENT | Comp. Ex. C | Comp. Ex. D | Ex. 14 | Ex. 15 | Ex. 16 |
|---|---|---|---|---|---|
| Citgo PG 70-22 | 100.0 | 97.5 | 97.8 | 97.5 | 97.2 |
| Citgo LCY T6302E | | 2.5 | | | |
| Polymer 1 | | | 2.2 | 2.5 | 2.8 |

Note:
Citgo PG 70-22 is an asphalt and Citgo LCY T6302E is a polymer obtained from Citgo; and Polymer 1 is an interpolymer prepared according to U.S. 2005/0140049.

Upon the completion of the blending process, the softening point and Dynamic Shear Rheometry properties of Comparative Examples C-D and Examples 14-16 were measured and the results are listed in Table 23 below. Comparative Examples C-D and Examples 14-16 were also heat-treated at 163° C. for 48 hours for compatibility/separation assessment. After the heat-treatment, the softening points and dynamic shear rheometery (DSR) properties of Comparative Examples C-D and Examples 14-16 were measured again. The results are also shown in Table 23 below.

TABLE 23

|  |  | Comp. Ex. C | Comp. Ex. D | Ex. 14 | Ex. 15 | Ex. 16 |
|---|---|---|---|---|---|---|
| ORIGINAL PROPERTIES | | | | | | |
| Softening Point, ° F. after 4 hrs | | 131 | 142 | 137 | 141.3 | 143.8 |
| DSR, G*/Sin δ, kPa | 76° C. | 0.799 | 1.729 | 1.306 | 1.527 | 1.796 |
| Phase Angle, ° | | 85.5 | 79.1 | 83.4 | 82.7 | 81.9 |
| Separation/Compatibility: 163° C./48 hrs | | | | | | |
| Softening Point Top 1/3, ° F. | | 134.5 | 145.1 | 141.0 | 143.5 | 157.5 |
| DSR Top 1/3, G*/Sin δ, kPa | 76° C. | 1.029 | 2.095 | 1.966 | 2.079 | 4.766 |
| Softening Point Bottom 1/3, ° F. | | 133.5 | 144 | 137 | 138 | 140 |
| DSR Bottom 1/3, G*/Sin δ, kPa | 76° C. | 1.064 | 2.257 | 1.376 | 1.591 | 1.882 |
| SP Difference, ° F. | | 1.0 | 1.1 | 4.0 | 5.5 | 17.5 |
| DSR Difference, kPa | | +0.035 | +0.162 | −0.590 | −0.488 | −2.884 |

Comparative Examples C-D and Examples 14-16 were subjected to the RTFOT and PAV tests. Before the RTFOT and PAV tests, Comparative Examples C-D and Examples 14-16 were measured for their flash points, DSR properties elastic recovery properties, and softening points. The results are shown in Table 24 below.

TABLE 24

| Ingredient ORIGINAL PROPERTIES: | | | Comp. Ex. C | Comp. Ex. D | Ex. 14 | Ex. 15 | Ex. 16 |
|---|---|---|---|---|---|---|---|
| Flash Point, COC, ° F. | | | 565 | 545 | 536 | 530 | 545 |
| Original DSR | G*/Sin δ, kPa | 70° C. | 1.656 | 3.449 | 2.978 | — | — |
| | Phase Angle, ° | | 85.1 | 76.4 | 80.8 | | |
| | G*/Sin δ, kPa | 76 ° C. | 0.785 | 1.783 | 1.535 | 1.71 | 1.98 |
| | Phase Angle, ° | | 86.2 | 78.8 | 82.6 | 82.0 | 82.6 |
| | G*/Sin δ, kPa | 82° C. | | 0.954 | 0.807 | 0.890 | 1.00 |
| | Phase Angle, ° | | | 81.3 | 83.9 | 83.2 | 84.2 |
| | G*/Sin δ, kPa | 88° C. | | | | | 0.538 |
| | Phase Angle, ° | | | | | | 85.1 |
| Viscosity, cps | | 135° C. | 725 | 1.460 | 1.045 | 1.375 | 1.616 |
| | | 165° C. | 182 | 340 | 250 | 363 | 416 |
| Elastic Recovery, % (D 6084) | | 25° C. | 26 | 60 | 44 | 41 | 43 |

The Rolling Thin Film Oven Test (RTFOT)

The RTFOT was carried out to test the ability of Comparative Examples C-D and Examples 14-16 in withstanding different temperature conditions. After the RTFOT, the samples were tested for mass loss, DSR properties, elastic recovery, and MSCR (multiple stress creep recovery found in, for example, "New Standard Test Method for Multiple Stress Creep and Recovery (MSCR) of Asphalt Binder Using a Dynamic Shear Rheometer" entitled AASHTO M-320, published by SHARP, and incorporated herein by reference). The testing methods and results are shown in Table 25 below.

TABLE 25

| Properties After RTFOT | | Comp. Ex. C | Comp. Ex. D | Ex. 14 | Ex. 15 | Ex. 16 |
|---|---|---|---|---|---|---|
| Mass Change, % | | −0.087 | −0.089 | −0.071 | | |
| DSR, G*/Sin δ, kPa | 70° C. | 3.674 | 6.660 | 7.00 | | |
| | 76° C. | 1.734 | 3.418 | 3.37 | 3.86 | 4.84 |
| | 82° C. | | 1.812 | 1.64 | 1.89 | 2.37 |
| | 88° C. | | | | | 1.22 |

TABLE 25-continued

| Properties After RTFOT | | Comp. Ex. C | Comp. Ex. D | Ex. 14 | Ex. 15 | Ex. 16 |
|---|---|---|---|---|---|---|
| Elastic Recovery, % (D 6084) 10 cm, cut, 1 hr | 25° C. | 35 | 69 | 41 | 45 | 45 |
| Elastic Recovery, % (AASHTO T 301) 20 cm, 5 min, cut, 1 hr | 25° C. | 12 | 65 | 28.5 | 32.5 | 33.5 |
| MSCR % Recovery 100 Pa | 76° C. | | 6 | 22 | 4 | |
| % Recovery 3,200 Pa | | | 0 | 5 | 0 | |

The Pressure Aging Vessel (PAV) Test

The PAV test was carried out to assess the performance of Comparative Examples C-D and Examples 14-16 after aged at 100° C. and 300 psi for 20 hrs. The PAV residues were tested for DSR, creep stiffness, and performance grades according to the procedures disclosed above. The testing methods and results are shown in Table 26 below.

TABLE 26

| PROPERTIES OF PAV RESIDUE (100° C.; 300 psi; 20 hrs) | | Comp. Ex. C | Comp. Ex. C | Ex. 14 | Ex. 15 | Ex. 16 |
|---|---|---|---|---|---|---|
| DSR, G*/Sin δ, kPa | 31° C. | | 2,608 | 2,958 | 3,030 | 3,130 |
| | 28° C. | 3,595 | 3,877 | 4,351 | 4,440 | 4,550 |
| | 25° C. | 5,312 | 5,458 | 6,234 | 6,390 | 6,460 |
| Creep Stiffness | Stiffness, MPa −06° C. | | | 136 | 138 | 148 |
| | m Value | | | 0.362 | 0.364 | 0.356 |
| | Stiffness, MPa −12° C. | 255 | 244 | 307 | 300 | 315 |
| | m Value | 0.339 | 0.314 | 0.301 | 0.307 | 0.301 |
| | Stiffness, MPa −18° C. | 537 | 472 | 543 | | |
| | m Value | 0.265 | 0.246 | 0.242 | | |
| Softening Point, ° F. after 24 hrs | | 136 | | 156.5 | 148.5 | 154.5 |

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

We claim:

1. A composition comprising an ethylene/alpha-olefin interpolymer and a bituminous material, wherein the interpolymer optionally comprises at least one diene, and wherein the interpolymer is derived from polymer particles having a surface coating comprising a partitioning agent.

2. The composition of claim 1, wherein the mean particle size of the polymer particles is less than about 3 mm.

3. The composition of claim 1, wherein the polymer particles are prepared by polymerizing the ethylene, at least one alpha-olefin, and, optionally, at least one diene in the presence of a catalyst and the partitioning agent in at least one fluidized bed reactor.

4. The composition of claim 2, wherein the polymer particles are prepared by polymerizing the ethylene, at least one alpha-olefin, and, optionally, at least one diene in the presence of a catalyst and the partitioning agent in at least one fluidized bed reactor.

5. The composition of claim 1 which further comprises a styrene block copolymer.

6. The composition claim 1 which further comprises styrene-butadiene-styrene.

7. The composition of claim 3, wherein the interpolymer comprises a diene, and wherein the amount of ethylene is from about 40 wt. % to about 80 wt. %, based on the total weight of polymerizable monomers, the amount of the α-olefin is from about 20 wt. % to about 60 wt. %, based on the total weight of polymerizable monomers, and the amount of the diene is from about 0.5 wt. % to about 15 wt. %, based on the total weight of polymerizable monomers.

8. The composition of claim 7, wherein the monomeric unit of the diene is further reacted with a crosslinking agent.

9. The composition of claim 3, wherein the interpolymer comprises a diene, and wherein the α-olefin is propylene and the diene is ethylidene norbornene.

10. The composition claim 3, wherein the amount of the partitioning agent is from about 5 wt. % to about 50 wt. %, based on the total weight of the polymer particles and the partitioning agent.

11. The composition of claim 3, wherein the partitioning agent is selected from the group consisting of carbon black, graphite, silica, alumina, alumina silicate, kaolin, clay, di-2-ethylhexyl phthalate, a metal stearate, and mixtures thereof.

12. The composition of claim 11, wherein the partitioning agent is carbon black.

13. The composition of claim 1, wherein the mean particle size of the polymer particles is less than about 1 mm.

14. The composition of claim 1, wherein the polymer particles have a polymer Mooney viscosity from about 20 to about 200.

15. The composition of claim 1, wherein the interpolymer has a crystallinity of from about 0 to about 25%, as determined by DSC.

16. The composition of claim 1, wherein the composition further comprises an additive.

17. The composition of claim 16, wherein the additive is selected from the group consisting of polymers, aggregates, fillers, heat stabilizers, UV stabilizers, antioxidants, lubricants, solvents, extenders, plasticizers, emulsifiers, reinforcing agent, crosslinking agents, compatibilizing agent, and combinations thereof.

18. The composition of claim 17, wherein the aggregate is selected from the group consisting of carbon black, graphite, clays, sands, pebbles, stones, crushed rocks, talc, kaolin, dolomite, calcium carbonate, calcium sulfate, silica, aluminum silicate, alumina, hydrated alumina, mica, wollastonite, feldspar, ceramic, glass, barite and combinations thereof.

19. The composition of claim 1, wherein an inner portion of a majority of the polymer particles are substantially free of carbon black.

20. The composition of claim 1, wherein an inner portion of a majority of the polymer particles comprises an additive selected from the group consisting of polymers, aggregates, fillers, heat stabilizers, UV stabilizers, antioxidants, lubricants, solvents, extenders, plasticizers, emulsifiers, reinforcing agent, crosslinking agents, compatibilizing agent, and combinations thereof.

21. The composition of claim 1, wherein the composition is formed by mixing the polymer with the bituminous material, and wherein the polymer is not substantially degraded during the mixing.

22. The composition of claim 1, wherein there is no substantial increase in gel formation after the composition is stored at a temperature greater than 100° C. for greater than one hour.

23. The composition of claim 1, wherein the composition further comprises another polymer.

24. An article comprising at least one component formed from the composition of claim 1.

25. A waterproof sheet or membrane comprising a layer which comprises the composition of claim 1.

26. The waterproof sheet or membrane of claim 25 further comprising a second layer and a support.

27. The waterproof sheet or membrane of claim 26, wherein the support comprises paper, felt, glass fibers or a combination thereof.

28. The waterproof sheet or membrane of claim 27, further comprising an inorganic aggregate selected from clays, sands, pebbles, stones, granules, talc, kaolin, dolomite, calcium carbonate, calcium sulfate, silica, aluminum silicate, alumina, hydrated alumina, mica, wollastonite, feldspar, ceramic, glass, barite and combinations thereof.

29. The composition of claim 1, wherein the composition further comprises an emulsifying agent.

30. The composition of claim 1, wherein the composition is in the form of an emulsion.

31. The composition of claim 1 wherein the composition further comprises an compatibilizing agent.

32. A roofing structure comprising the composition of claim 1.

33. A paved structure comprising the composition of claim 1.

* * * * *